(12) United States Patent  (10) Patent No.: US 8,327,110 B2
Yamamoto  (45) Date of Patent: Dec. 4, 2012

(54) STORAGE SYSTEM INCLUDING A VIRTUAL VOLUME, A PLURALITY OF DISK DRIVES AND A PLURALITY OF FLASH MEMORY DEVICES

(75) Inventor: Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/216,629

(22) Filed: Aug. 24, 2011

(65) Prior Publication Data

US 2011/0307680 A1  Dec. 15, 2011

Related U.S. Application Data

(63) Continuation of application No. 11/968,747, filed on Jan. 3, 2008, now Pat. No. 8,028,146.

(30) Foreign Application Priority Data

Aug. 9, 2007 (JP) ................................. 2007-207357

(51) Int. Cl.
G06F 12/02 (2006.01)
(52) U.S. Cl. ........................................ 711/173; 711/103
(58) Field of Classification Search .................. 711/103, 711/173
See application file for complete search history.

(56) References Cited

U.S. PATENT DOCUMENTS

| | | | |
|---|---|---|---|
| 5,420,998 A | 5/1995 | Horning | |
| 5,754,888 A | 5/1998 | Yang et al. | |
| 5,860,083 A | 1/1999 | Sukegawa | |
| 5,930,193 A | 7/1999 | Achiwa et al. | |
| 7,644,239 B2 | 1/2010 | Ergan et al. | |
| 7,680,981 B2 | 3/2010 | Yamamoto et al. | |
| 7,716,422 B2 | 5/2010 | Shin et al. | |
| 7,908,433 B2 | 3/2011 | Yamamoto et al. | |
| 2004/0257857 A1 | 12/2004 | Yamamoto et al. | |
| 2005/0091455 A1 | 4/2005 | Kano et al. | |
| 2005/0144389 A1 | 6/2005 | Trika et al. | |
| 2005/0246487 A1 | 11/2005 | Ergan et al. | |
| 2006/0248242 A1 | 11/2006 | Andersen et al. | |
| 2007/0022241 A1 | 1/2007 | Sinclair | |
| 2007/0033341 A1 | 2/2007 | Hashimoto et al. | |
| 2007/0288692 A1 | 12/2007 | Bruce et al. | |
| 2008/0126673 A1 | 5/2008 | Kaneda | |
| 2008/0126734 A1* | 5/2008 | Murase ......................... 711/170 |
| 2009/0089500 A1 | 4/2009 | Jiang | |

FOREIGN PATENT DOCUMENTS

| | | |
|---|---|---|
| CN | 1801121 | 7/2006 |
| CN | 1881937 A | 12/2006 |
| EP | 0 564 699 A1 | 10/1993 |
| EP | 1 785 829 A1 | 5/2007 |
| EP | 1 804 169 A1 | 7/2007 |
| JP | 8-016482 | 1/1996 |
| JP | 2003-015915 | 1/2003 |
| JP | 2005-011277 | 1/2005 |
| JP | 2006-4407 A | 1/2006 |
| WO | 97/26600 | 7/1997 |

* cited by examiner

*Primary Examiner* — Jared Rutz
(74) *Attorney, Agent, or Firm* — Mattingly & Malur, PC

(57) ABSTRACT

The temporary area capacity required to be secured with respect to the whole permanent area is calculated in accordance with the capacity and access frequency of a host computer data permanent area of a disk device contained in the storage system and a disk device of an external storage device that is managed by a storage virtualization function of this storage system. The nonvolatile memory is defined as the temporary area and is used to temporarily store host computer data when a data I/O from the host computer is processed. The required capacity of the temporary area is re-calculated in accordance with an event such as a configuration change in the external storage system.

15 Claims, 20 Drawing Sheets

LU PATH MANAGEMENT INFORMATION 202

PHYSICAL DEVICE MANAGEMENT INFORMATION 203

EXTERNAL DEVICE MANAGEMENT INFORMATION 204

CONFIGURATION INFORMATION FOR LOGICAL DEVICE #0:
- EXTERNAL DEVICE NUMBER — 601
- SIZE — 602
- CORRESPONDING UPPER-LEVEL DEVICE NUMBER — 603
- DEVICE STATE — 604
- STORAGE IDENTIFICATION INFORMATION — 605
- EXTERNAL STORAGE INTERNAL DEVICE NUMBER — 606
- INITIATOR PORT NUMBER LIST — 607
- TARGET PORT ID/TARGET ID/LUN LIST — 608

POOL VOLUME MANAGEMENT INFORMATION 208

TEMPORARY AREA DEFINITION INSTRUCTION PROCESSING 243

TEMPORARY AREA ASSIGNMENT PROCESSING 224

FIG. 21

ADDRESS CONVERSION TABLE 2100

| FILE ADDRESS 1 ~2110 | LBA01 ~2120 |
|---|---|
| FILE ADDRESS 2 ~2111 | LBA02 ~2121 |
| FILE ADDRESS 3 ~2112 | LBA03 ~2122 |
| FILE ADDRESS 4 ~2113 | LBA04 ~2123 |
| FILE ADDRESS 5 ~2114 | LBA05 ~2124 |
| FILE ADDRESS 6 ~2115 | LBA06 ~2125 |
| FILE ADDRESS 7 ~2116 | LBA07 ~2126 |
| ⋮ | ⋮ |

FIG. 22

FILE COLLECTION INFORMATION 2200

| | |
|---|---|
| FILE NAME | ~2220 |
| FILE GENERATION DATE AND TIME | ~2221 |
| FINAL ACCESS DATE AND TIME | ~2222 |
| FILE SIZE | ~2223 |
| FILE ADDRESS | ~2224 |
| STORAGE DESTINATION LU# | ~2225 |

STORAGE SYSTEM INCLUDING A VIRTUAL VOLUME, A PLURALITY OF DISK DRIVES AND A PLURALITY OF FLASH MEMORY DEVICES

CROSS-REFERENCE TO PRIOR APPLICATION

This application is a continuation application of U.S. Ser. No. 11/968,747, filed Jan. 3, 2008 (now U.S. Pat. No. 8,028, 146). This application relates to and claims the benefit of priority from Japanese Patent Application number 2007-207357, filed on Aug. 9, 2007 the entire disclosure of which is incorporated herein by reference.

BACKGROUND

The present invention generally relates to a control method and management method for a storage system that is accessed by a computer in a computer system and, more particularly, to a method for assigning storage areas of a nonvolatile memory built into the storage system and to a storage area management method.

The information that is handled by businesses and so forth has undergone an explosive increase in keeping with the deregulation of electronic document conversion and the conversion of procedures to electronic document format, as well as the increase in Internet business. In addition to an increase in such information, the amount of data stored in storage devices is increasing rapidly and leading to an increase in the scale of storage systems as a result of rising customer demand for the long-term archiving of recordings of corporate activities (transaction information and mail and so forth) in the form of data backups from one disk device to another disk device (Disk-to-Disk Backup) and audit handling.

Accordingly, there is a demand for simplification and increased efficiencies in the management of complex IT infrastructures at the same time as increased storage for the respective departments/respective systems in business information systems. In particular, expectations have increased for simplifying the management of storage devices and optimizing the total costs by using optimal storage in accordance with the value of data.

One method for reducing the management costs of large-scale storage systems includes the storage virtualization technology as disclosed in Japanese Application Laid Open No. 2005-11277. Japanese Application Laid Open No. 2005-11277 discloses a storage virtualization technology (referred to as an 'external storage connection method' hereinbelow) that connects a first storage system to one or more second storage systems and provides a higher level such as a host with a device (called a 'logical device' hereinbelow) that is provided to the host or the like by a second storage system as a logical device of the first storage system via the first storage system. When the first storage system receives an I/O request with respect to the logical device from the host, it is judged whether the access target device corresponds to either a logical device of the second storage system or a physical device such as a disk device in the first storage system and I/O requests are distributed to suitable access destinations in accordance with the result of this judgment.

In addition, one method for simplifying the storage system design includes a volume management technology that is capable of dynamic capacity expansion of the kind disclosed in Japanese Application Laid Open No. 2003-15915 (A volume capacity of which is expanded dynamically called an expansion volume hereinbelow). In Japanese Application Laid Open No. 2003-15915, during the definition of a logical device, a pool area is provided in a storage system instead of assigning a fixed physical storage area (HDD or the like) corresponding to a device capacity that is requested by the user and, when update access has been made to the logical device, a physical storage area of a prescribed amount is dynamically added from the pool area corresponding to the updated part. As a result, a large-capacity logical device can be introduced using a small physical storage area and the storage capacity design can be simplified.

On the other hand, as one method for reducing the introduction and running costs of a large-scale storage system that stores a large amount of data of the kind mentioned hereinabove, the storage mounting technology that adopts a nonvolatile memory such as the flash memory disclosed in Japanese Patent No. 3507132 may be considered. Japanese Patent No. 3507132 discloses measures against write failure in the event of an increase in the number of rewrites which is a drawback of flash memory. A storage system that has a built-in nonvolatile memory such as flash memory instead of or in addition to a HDD and stores data which are written to or read from the nonvolatile memory by a host by using the technology of Japanese Patent No. 3507132 may be considered. A storage device that combines an increase in the I/O processing speed with a reduction in the power consumed in comparison with a storage device that contains a disk device by storing host data in a nonvolatile memory can be provided. As a result, miniaturization of the system introduced and a reduction in the system running costs (the amount of power consumption) can be implemented. Flash memory, which constitutes the current mainstream form of nonvolatile memory, possesses low I/O performance in comparison with DRAM or S-RAM which are used for the main memory of computers. Furthermore, flash memory also possesses low input performance in comparison with HDD. Furthermore, flash memory also possesses the characteristic of adversely affecting user convenience (e.g. write count restrictions and so forth), hence, flash memory is adopted as a secondary storage device to substitute disk devices and so forth.

The first storage system shown in Japanese Application Laid Open No. 2005-11277 must contain a cache memory for the I/O processing of the second storage system which is an external storage system. Cache memory temporarily stores read or write target data when I/O processing is performed with respect to a disk device that the storage system contains, implements high-speed read and write processing using cache hits and is built into almost all storage systems. In this specification, a storage area that temporarily stores data as per cache memory is called a 'temporary area' and a storage area constituting the final storage destination for data as per a disk device is called as a 'permanent area'.

In order to execute high-speed I/O with respect to an external storage system, a cache memory (temporary area) of the capacity required for I/O processing must be assigned to I/O processing in accordance with the capacity of the external storage system and access characteristic (locality) thereof.

Conventionally, a memory device such as a DRAM or SRAM has been adopted as the cache memory (temporary area) and has contributed toward increased storage system speeds as a storage medium that possesses completely different characteristics from a disk device (permanent area), which is termed 'high cost, high-speed, and small capacity'. Conversely, in addition to a built-in disk device (permanent area) in the above first storage system, the inclusion of a memory device as a temporary area used for an external storage system (and an internal built-in disk device) in order to respond to the characteristics required of a temporary area has not been possible.

However, in cases where the first storage system comprising external storage connection means is a storage system that uses a nonvolatile memory as the permanent area, a nonvolatile memory can be used as a temporary area of the external storage in the same way as a permanent area. By using a nonvolatile memory as a temporary area or a permanent area, there is no longer a need to mount both a disk device and memory together and the hardware is simplified, whereby a reduction in hardware costs is possible. However, in this implementation, a management technology that is capable of determining and managing the capacity and locations of the temporary and permanent areas assigned in the nonvolatile memory is required in the implementation. In addition, a change to the temporary area assignment that satisfies the IO processing requirements of the external storage in accordance with an addition to or reduction in the external storage system as well as changes to the access characteristics is required.

In addition, in the next-generation nonvolatile memories such as MRAM and PRAM for which research is progressing as a future technology, the implementation of a high-speed characteristic that rivals that of DRAM or the like and the elimination of write limitations is planned and a new architecture will be necessary at the time such a new nonvolatile memory is introduced.

SUMMARY

An object of the present invention is to permit, in a storage system that comprises external storage connection means and comprises a storage system that contains a nonvolatile memory as a permanent area and an external storage system, the determination of a temporary area capacity that meets the I/O processing requirements of the external storage system, as well as the selection of assigned areas.

The management server and storage system determine the capacity of a temporary area that is assigned to a nonvolatile memory contained in a storage system, that is, the capacity of a storage area that stores data temporarily during data inputs and outputs from the host, in accordance with instructions from the user or an application program and changes to the configuration such as an addition to or reduction in the storage devices and assigns the temporary area to a specified area of the nonvolatile memory.

In addition, the capacity of the temporary area assigned to the nonvolatile memory is increased or reduced in accordance with changes in the capacities of data permanent areas such as disk devices or nonvolatile memory, that is, of storage areas that store host data and in accordance with changes to the access characteristics of such areas.

BRIEF DESCRIPTION OF THE DRAWINGS

FIG. 21 shows an example of an address conversion table held by the management server according to the second embodiment;

FIG. 22 shows an example of file collection information that is collected by the host computer 100 according to the second embodiment.

DESCRIPTION OF THE PREFERRED EMBODIMENTS

Preferred embodiments of the present invention will be described hereinbelow.

First and second embodiments will be described as embodiments of the computer system of the present invention and the storage and device control methods of the present invention.

The first embodiment is a computer system in which a host computer, a first storage system, a second storage system that is connected between the host computer and the first storage system, and a management server are connected via a network, wherein the second storage system contains a nonvolatile memory as a permanent area and contains a storage virtualization function that permits virtual integration of a device of another storage system as its own device, and the management server and second storage system determine the capacity of the temporary area in accordance with an instruction from the user or from an application, and secures and assigns a temporary area of this capacity in the nonvolatile memory. The device definition processing and I/O processing of the present invention will also be described.

Using the same configuration as the first embodiment, the second embodiment calculates the temporary area capacity that needs to be assigned in accordance with the capacities and access characteristics of the disk devices contained in the first storage device and second storage system and the capacity and access characteristic of the permanent area in the nonvolatile memory and performs control to increase or reduce the required temporary area assignment amount in accordance with the result of a comparison with the existing assignment amount. The device migration instruction processing of the present invention will also be described.

First Embodiment

Figure 1:
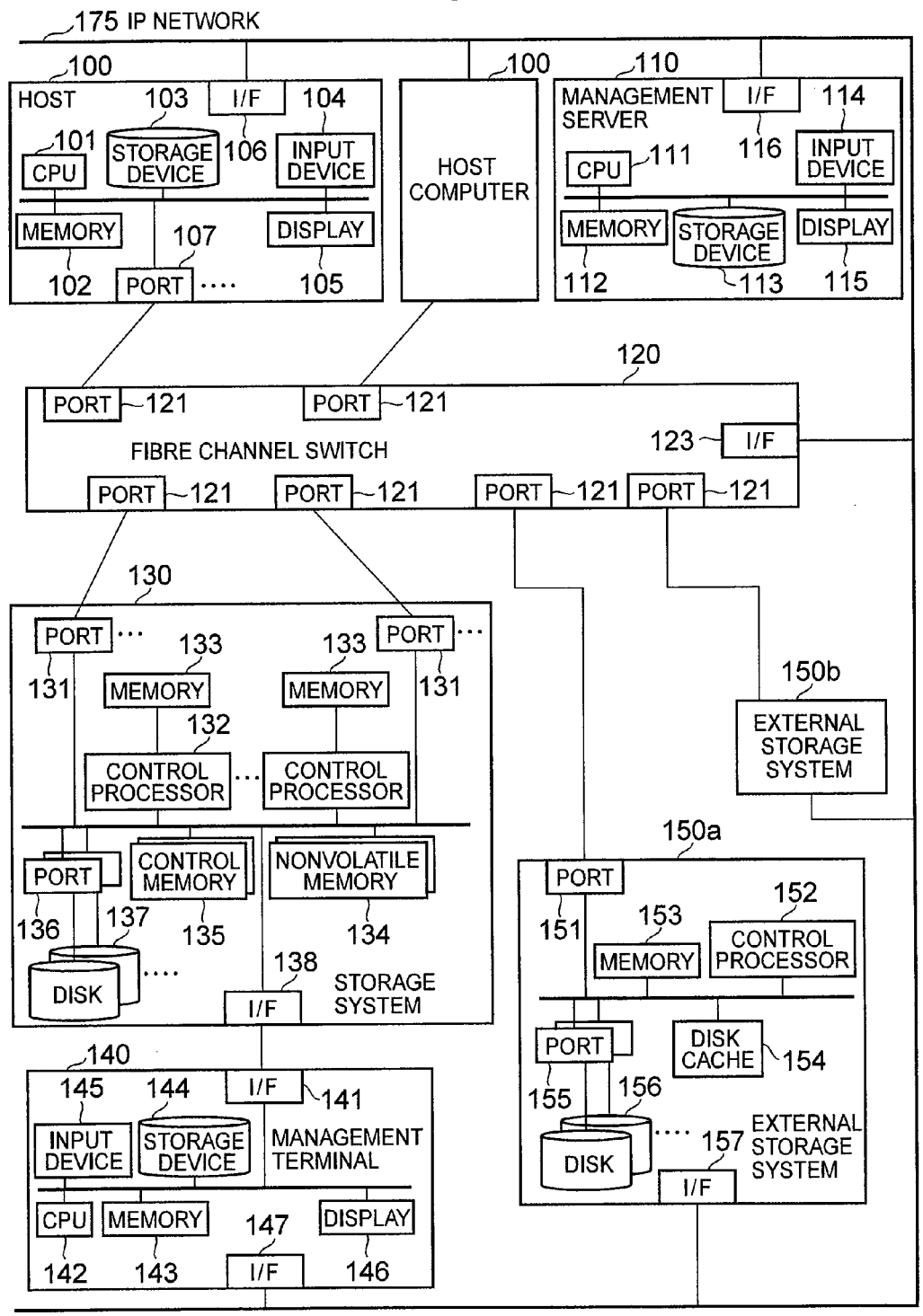
FIG. 1 shows an example of the hardware configuration of a computer system.

The first embodiment will first be described with reference to FIGS. 1 to 13 and FIGS. 19 and 20. FIG. 1 shows an example of the hardware configuration of a computer system to which the first embodiment of the present invention is applied.

The computer system comprises one or more host computers 100, a management server 110, a fibre channel switch 120, a storage system 130, a management terminal 140, and external storage systems 150a and 150b (generically referred to as the external storage systems 150). The host 100, storage system 130, and external storage systems 150 are connected via ports 107, 131, and 151 respectively to ports 121 of the fibre channel switch 120. In addition, the host 100, storage system 130, external storage systems 150, and fibre channel switch 120 are connected via interface control sections (I/F) 106, 138, 157, and 123 respectively to the management server 110 via an IP network 175 and are integrally managed by storage management software (not shown) which is operated by the management server 110. This embodiment takes a form where the storage system 130 is connected to the management server 110 via the management terminal 140 but may also have a configuration where the storage system 130 is connected directly to an IP network.

The host computer 100 is a computer that comprises a CPU 101 and a memory 102 and so forth and reads software such as an operating system and application programs which are stored in a storage device 103 such as a disk device or magneto-optical disk device to the memory 102. The host computer 100 affords predetermined functions as a result of the CPU 101 reading this software from the memory 102 and executing the software. The host computer 100 comprises an input device 104 such as a keyboard and a mouse and an output device such as a display 105, where the input device 104 receives an input from the host administrator or the like, and the output device outputs information for which an output instruction has been issued by the CPU 101. Further, the host computer 100 comprises one or more interface control sections 106 for a connection with the IP network 175 in addition to port 107.

The management server 110 is also a computer comprising a CPU 111 and a memory 112 and reads storage management software which is stored in a storage device 113 such as a disk device or magneto-optical disk device to the memory 112. The management server 110 affords predetermined functions such as a function for the operation and maintenance management of the whole computer system as a result of the CPU 111 reading the storage management software from the memory 112 and executing same. When storage management software is executed by the CPU 111, the management server 110 collects configuration information, the resource usage rate, performance monitoring information, and fault logs and so forth from the respective devices in the computer system via IP network 175 from the interface control section 116. The management server 110 then outputs the information thus collected to an output device such as a display 115 and presents the storage administrator with the information. In addition, the management server receives an instruction from the storage administrator via an input device 114 such as a keyboard and a mouse and transmits the operation and maintenance instruction thus received to the respective devices via the interface control section 116.

The storage system 130 has a configuration in which one or more ports 131, one or more control processors 132, one or more memories 133 each connected to the control processors 132, one or more nonvolatile memories 134, one or more control memories 135, one or more ports 136, one or more disk devices 137 which are connected to the respective ports 136, and an interface control section 138 are connected via an internal link network.

The control processor 132 specifies an access target device in response to the I/O request received from port 131 and processes I/O requests for the disk device 137 to which the device corresponds and for devices in the external storage system 150. Thereupon, the control processor 132 specifies an access target device from the port ID and LUN (Logical Unit Number) contained in the received I/O request. In this embodiment, although a port that corresponds with the fibre channel interface for which SCSI (Small Computer System Interface) serves as the higher level protocol is assumed as port 131, the port may also be a port that corresponds with another storage connection network interface such as an IP network interface for which SCSI is the higher level protocol (iSCSI, for example), or the like.

The storage system 130 of this embodiment has the following device hierarchy. First, a storage device array of a plurality of disk devices 137 or a plurality of permanent areas of the nonvolatile memory 134 is constituted. This storage device array is managed as one physical device by the control processor 132. In addition, the control processor 132 of the present invention directly assigns a logical device to the physical device contained in the storage system 130 (that is, the control processor 132 associates physical devices and logical devices). The logical devices are managed within the storage system 130 and the numbers of the logical devices are managed individually for each storage system 130. The logical devices are associated with the LUN assigned to the respective ports 131 and supplied to the host computer 100 as devices of the storage system 130. That is, the logical devices of the storage system 130 are identified by the host computer and the host computer 100 accesses the data stored in the storage system 130 by using the LUN of the ports 131 corresponding with the logical devices. In this specification, there is an external storage connection method according to which the control processor 132 manages the logical devices of the external storage systems 150 as external devices and virtualizes same as devices of the storage system 130. One or more of the external devices which are incorporated by using the external storage connection are directly associated with the logical devices of the storage system 130 as per the physical devices. The external devices are also individually managed within the respective storage systems 130. Further, in this embodiment, an expansion volume technology that expands a logical device, that is, a virtual volume management technology that allows physical storage areas to be dynamically added and assigned to an update access part can also be applied. In this case, a pool volume is assigned to a physical device or external device and a logical device is assigned to an expansion volume by defining the expansion volume in correspondence with the pool volume. Here, an expansion volume is a virtual device which uses an expansion volume technology and corresponds one for one with the logical device. A pool volume is a virtual device that manages a physical storage area which is assigned dynamically to an expansion volume. In this specification, for the sake of simplification, a pool volume corresponds with one physical device or external device but one pool volume may also be constituted by a plurality of physical devices or external devices. In order to implement the device hierarchy above, the control processor 132 performs processing to manage the relationships between respective devices such as logical devices, expansion volumes, pool volumes, physical devices, disk devices 137, permanent areas of nonvolatile memory 134, external devices, logical devices of external storage systems 150, convert an access request for a logical device into an access request for a logical device of the disk device 137, the permanent area of the nonvolatile memory 134, or the external storage device 150, and transmit the converted access request to the appropriate device. As mentioned earlier, the storage system 130 of this embodiment defines one or a plurality of physical devices starting with a plurality of disk devices 137 or a plurality of areas of the permanent area of the nonvolatile memory 136 (that is, an association is made with one or a plurality of physical devices starting with a plurality of disk devices 137 or a plurality of areas of the permanent area of the nonvolatile memory 136, for example) and assigns one logical device or one pool volume to one physical device and provides same to the host computer 100. However, it is understood that the individual disk devices 137 or an area of the permanent area of the nonvolatile memory 136 may also be one physical device and one logical device or one pool volume.

Further, in addition to the I/O processing with respect to the device, the control processor 132 executes various processing to implement data sharing between devices such as data duplication and data repositioning.

In addition, the control processor 132 transmits configuration information which is to be presented to the storage administrator to the management terminal 140 which is connected via the interface control section 138 and implements configuration changes to the storage system 130 upon receiving, from the management terminal 140, a maintenance and operation instruction which is input to the management terminal 140 by the administrator.

The nonvolatile memory 134 is utilized after being partitioned into a temporary area and permanent area. The temporary area increases the processing speed with respect to access requests from the host computer 100 and, therefore, data which are read frequently by the disk device 137 are pre-stored and write data received from the host computer 100 are temporarily stored. In cases where a 'write-after' which employs the temporary area of the nonvolatile memory 134 is performed, that is, in cases where, after the write data received from the host computer 100 have been stored in the temporary area of the nonvolatile memory 134, a response to the write request is sent back to the host computer 100 before the write data are actually written to the disk device 137, it is desirable to increase the availability through duplication in order to increase the resistance of the nonvolatile memory 134 to medium failure in order to prevent the write data stored in the temporary area of the nonvolatile memory 134 from disappearing prior to being written to the disk device 137. However, the permanent area is used to ultimately store the data of the host computer 100 in the same way as the disk device 137. Accordingly, for the sake of the bit cost and in order to increase the speed of the I/O processing performance, the temporary area desirably has a small capacity but effects high speed access through simple duplication and the permanent area provides a storage area which is accessed at a relatively low speed but which has a large capacity and low cost by adopting a redundant array configuration such as RAID5 as is the case for disk device 137. Further, according to the present invention, for the sake of simplicity, the permanent area of the nonvolatile memory 134 holds and manages an identification number for each small area of a prescribed size and a physical device is defined for the whole of the permanent area.

Figure 20:
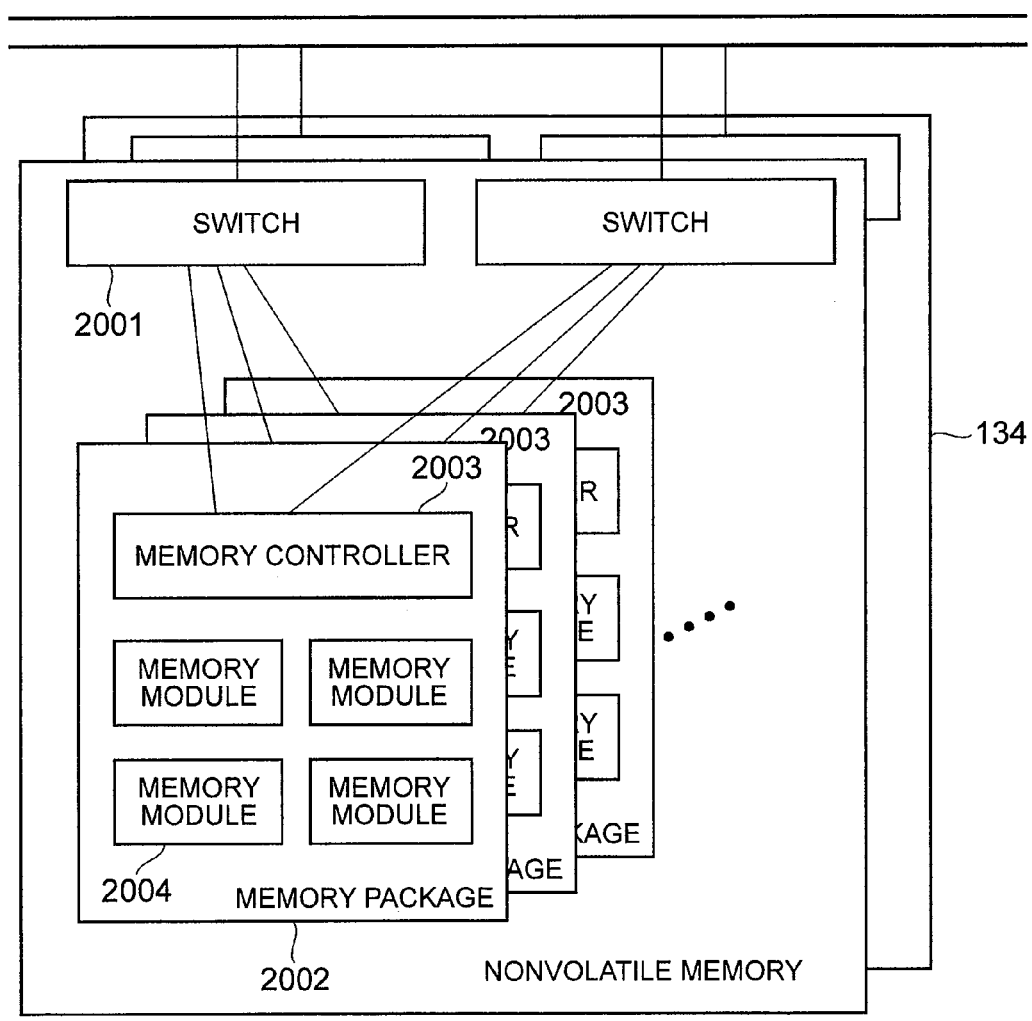
FIG. 20 shows an example of the configuration of a nonvolatile memory 134 that is contained in the storage system 130 according to the first and second embodiments.

FIG. 20 shows an embodiment of the nonvolatile memory 134. The nonvolatile memory 134 contains a plurality of switches 2001 and a plurality of memory packages 2002. The memory packages 2002 contain a plurality of nonvolatile memory modules 2004 and a memory controller 2003 that controls access to the memory modules 2004. The memory controller 2003 links the switches 2001 and the other components in the storage system 130 via an internal link network and implements memory access and data transfer.

The control memory 135 stores control information for managing the attributes of the respective devices for implementing the device hierarchy as well as the relationships between the devices and stores control information for managing disk written data or non-written data held in the temporary area of the nonvolatile memory 134. When the control information stored in the control memory 135 disappears, the data stored in the disk device 137 or the permanent area of the nonvolatile memory 134 can no longer be accessed and, therefore, the control memory 135 desirably has a configuration for high availability where the control memory 135 is made nonvolatile by means of a battery backup or is duplicated in order to increase the resistance to medium failure.

As shown in FIG. 1, the respective parts in the storage system 130 are connected using an internal link network such that the transmission and reception of data between the respective parts, control information, and configuration information is executed. As a result of the internal link network, the control processors 132 are able to share and manage configuration information on the storage system 130. The internal link network is desirably also multiplexed from the perspective of increased availability.

The management terminal 140 comprises a CPU 142, a memory 143, a storage device 144, an interface control section 141 which is connected to the storage system 130, an interface control section 147 that is connected to an IP network 175, an input device 145 that accepts inputs from the storage administrator, and an output device such as a display 146 that outputs configuration information and management information on the storage system 130 to the storage administrator. The CPU 142 reads a storage management program that is stored in the storage device 144 to the memory 143 and, as a result of executing this program, issues instructions to reference the configuration information and change the configuration information as well as operation instructions for specified functions, and constitutes an interface between the storage administrator or management server 110 and the storage system 130 with respect to maintenance operations on the storage system 130. The storage system 130 may also be connected directly to the management server 110 with the management terminal 140 omitted and the storage system 130 may also be managed by using management software that runs on the management server 110.

The external storage system 150 comprises one or a plurality of ports 151 that are connected to ports 131 of the storage system 130 via fibre channel switch 120, a control processor 152, a memory 153, a disk cache 154, one or a plurality of disk devices 156 and one or a plurality of ports 155 which are each connected to the disk devices 156. The control processor 152 processes an I/O request with respect to the disk device 156 received from the port 151 by executing a program that is stored in the memory 153. In this embodiment, the external storage system 150 is a storage system that does not comprise a control memory and has a smaller-scale configuration than the storage system 130 but could also be a storage system of the same scale with the same configuration as the storage system 130.

In this embodiment, because port 131 of the storage system 130 and port 151 of the external storage system 150 are connected via the fibre channel switch 120 as shown in FIG. 1, the zoning of the fibre channel switch 120 is desirably established so as to suppress direct access from the host computer 100 to the external storage systems 150. The port 131 and port 151 may also be directly connected via the fibre channel switch 120.

Figure 2:
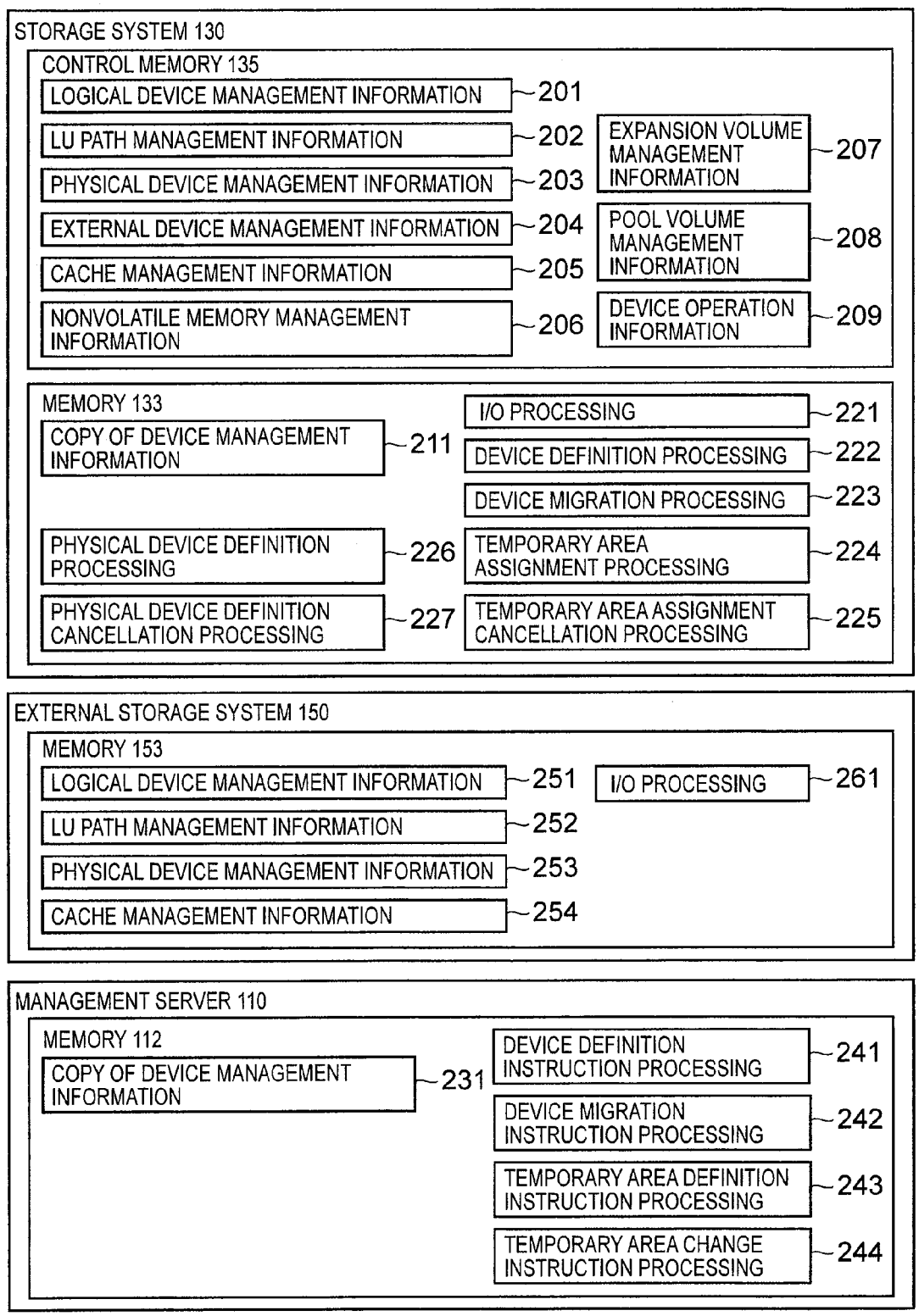
FIG. 2 shows an example of the software configuration of the storage system.

The software configuration of the storage system 130 of the embodiment of the present invention will be described next. FIG. 2 is a software configuration view of an example of the control memories of the storage system 130 and management server 110 as well as control information and a program for storage control processing which are stored in memory.

Configuration management information of the storage system 130 that is stored in the control memory 135 includes logical device management information 201, LU path management information 202, physical device management information 203, external device management information 204, cache management information 205, nonvolatile memory management information 206, expansion volume management information 207, pool volume management information 208, and device operation information 209. This information items are stored in the control memory 135 in this embodiment in order to prevent the disappearance of information. This control information can be referenced and updated by the control processor 132, whereupon access via a mutual connection network is required. Accordingly, for the sake of improving the processing performance, a copy of the control information required for the processing that is executed by the respective control processors 132 may also be saved in the memory 133. Further, configuration information for the storage system 130 is also transmitted to and saved in the control terminal 140 and management server 110. In cases where the management server 110 or management terminal 140 changes the configuration of the storage system 130 upon receipt of an instruction from the storage management software or storage administrator or cases where the configuration is changed as a result of a fault and the automatic exchange of the respective parts inside the storage system 130, one of the control processors 132 updates the configuration information in the control memory 135. Further, the control processor 132 reports the fact that the control information has been updated as a result of the configuration change to the other control processor 132, management terminal 140, and management server 110 via the mutual connection network and introduces the latest information from the control memory 135 to the memory of another part.

In addition, the external storage system 150 saves, in the same way as the storage system 130, logical device management information 251, LU path management information 252, physical device management information 253, and cache management information 254 in order to perform device management of the logical devices and physical devices inside its own devices and to perform data management. This content is used with the same objective as the same name information of the storage system 130.

In addition, the management server 110 saves a copy of the device management information that is collected from the storage system 130 and external storage system 150 and storage management information 232 that represents the attributes of the respective storage systems in the memory 112. This information may also be saved in the storage device 113 contained in the management server 110 in order to avoid data loss.

Figure 3:
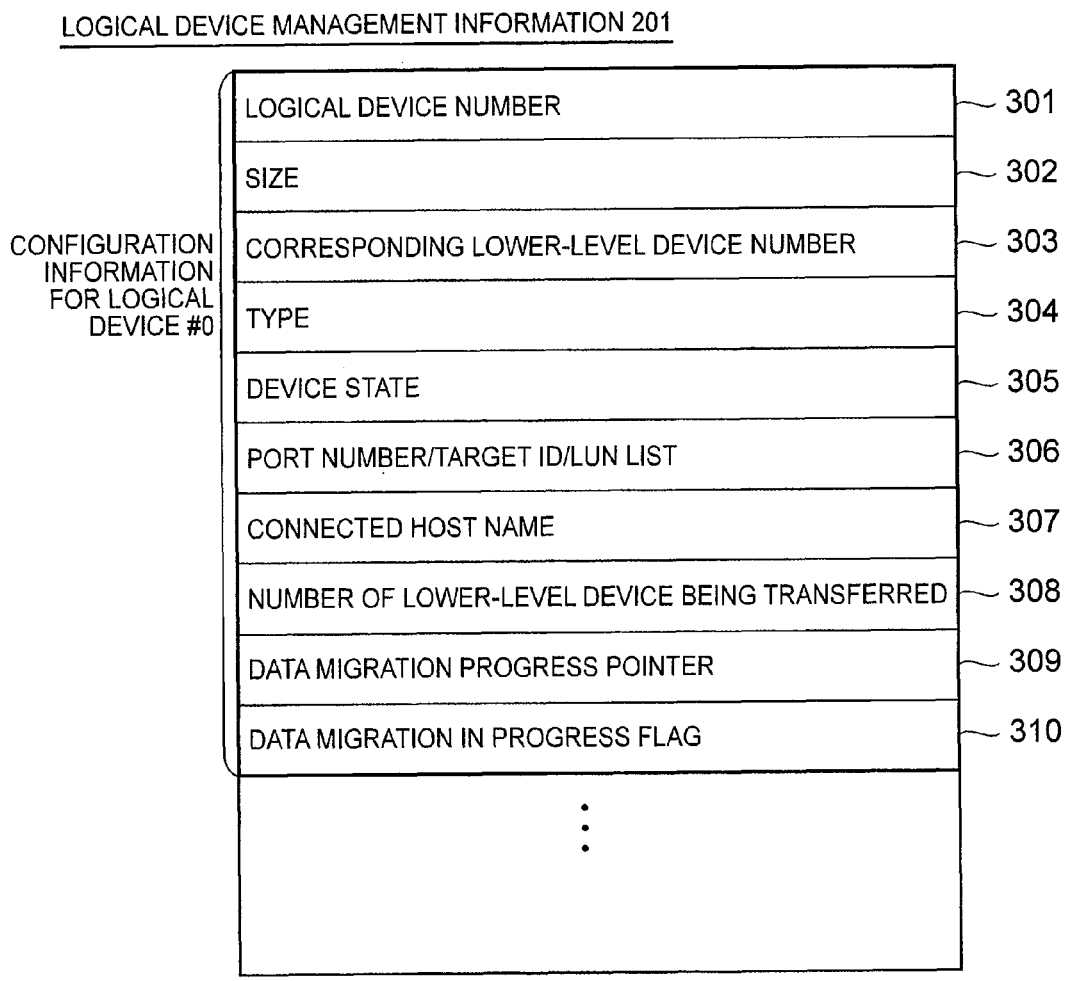
FIG. 3 shows an example of logical device management information.

The respective management information will be described next. First, logical device management information 201 will be described. FIG. 3 shows an example of logical device management information 201. The logical device management information 201 holds an information set that extends from a logical device number 301 to a data migration in progress flag 310 for each logical device. The logical device number 301 stores numbers assigned by the control processor 132 to the logical devices in order to identify the logical devices. Size 302 stores the capacity of the logical devices specified by the logical device number 301. The corresponding lower-level device number 303 stores the number of the physical device, external device, or expansion volume that is associated with the logical device, that is, the entry number of the physical device management information 203, external device management information 204, or expansion volume management information 207 which are respective management information. Although a logical device and physical device/external device/expansion volume correspond one for one in this embodiment, in cases where one logical device is formed by linking a plurality of physical devices or external devices, the logical device management information 201 requires a physical/external device number list to which the respective logical devices correspond and an entry for storing the number of logical devices. In cases where the logical devices are undefined, an invalid value is set for the corresponding lower-level device number 303. Type 304 stores device type identification information on the logical devices. The storage system 130 can define logical devices of a plurality of different device types such as data management units in the cache as well as the storage format of device management information (the existence of management information storage with respect to the disk space and the storage format, and so forth) and the particular device types of the respective logical devices are held by type 304.

Information indicating the logical device state is set for the device state 305. The states 'attached', 'detached', 'undefined', and 'blocked' exist. 'Attached' indicates a state where the logical device is working normally, an LU path has been defined for one or more ports 131, and the logical device can be accessed by the host computer 100. 'Detached' indicates a state where the logical device has been defined and is working normally but, since the LU path is undefined, same cannot be accessed by the host computer 100. 'Unmounted' indicates a state where the logical device has not been defined for a physical device or external device or expansion volume and cannot be accessed by the host computer 100. 'Blocked' indicates a state where a fault occurs in the logical device and cannot be accessed by the host computer 100. The initial value of the device state 305 is 'unmounted' and is changed to 'detached' as a result of logical device definition processing and changed to 'attached' as a result of LU path definition processing.

For the port number of entry 307, information indicating which port of the plurality of ports 131 has its LUN defined for the logical device, that is, identification information identifying the port 131 that is used in order to access the logical device are set. Here, identification information of the port 131 constitutes unique numbers in the storage system 130 that are assigned to the respective ports 131. In addition, the target ID and LUN stored in the same entry 307 are identifiers serving to identify the logical devices. In this embodiment, the identifiers serving to identify the logical devices which are used include an SCSI-ID and LUN which are used in cases where the device is accessed by the host computer 100 using SCSI. The entry 307 has information set when the LU path definition for the logical device is executed. The connected host name 308 is a host name that identifies the host computer 100 which has been granted access to the logical device. Any value may be employed as the host name so long as the value is a value that makes it possible to uniquely identify the host computer 100 or port 107 such as a WWN (World Wide Name) that is assigned to the port 107 of the host computer 100. The same storage system 130 holds management information relating to the port attributes such as the WWN of each port 131. The entry 308 is established by the storage administrator during logical device definition. The number of the lower-level device being transferred 308 stores the migration destination device number in cases where the logical device is being transferred from an existing physical device/external device/expansion volume to another physical device/external device/expansion volume. In cases where the logical device is undergoing data migration, 'ON' is stored in data migration in progress flag 310 and address information indicating the final area in which data migration is completed is stored in a data migration progress pointer 309. The entries 308 and 309 are valid only when the data migration in progress flag 310 is 'ON'.

Figure 4:
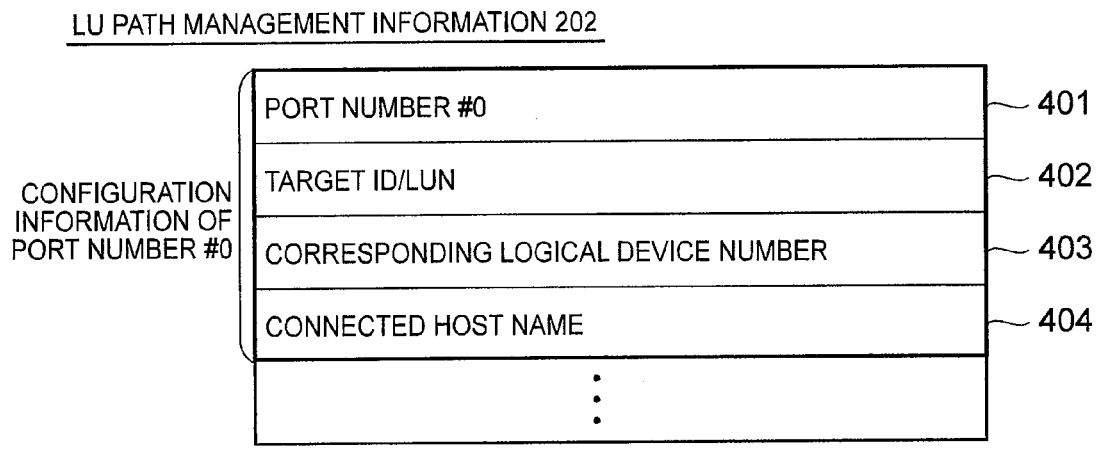
FIG. 4 shows an example of LU path management information.

Secondly, the LU path management information 202 will be described. FIG. 4 is an example of LU path management information 202. The LU path management information 202 holds information corresponding to valid LUN that have been defined for the respective ports for the respective ports 131 in the storage system 130. The entry of the target ID/LUN 402 stores the LUN defined for (assigned to) the ports 131. Corresponding logical device number 403 stores the number of the logical device to which the LUN is assigned. The connected host name 404 stores information indicating the host computer 100 that has been granted access to the LUN defined for the port 131 and the WWN assigned to the port 107 of the host computer 100, for example, is used as information representing the host computer 100. There are cases where the LUN of a plurality of ports 131 are defined for (assigned to) one logical device and the logical device can be accessed by a plurality of ports 131. In this case, the sum of sets of the connected host name 404 of the LU path management information 202 relating to the respective LUN of the plurality of ports 131 is held for the connected host name 308 of the logical device management information 201 relating to the logical devices.

Figure 5:
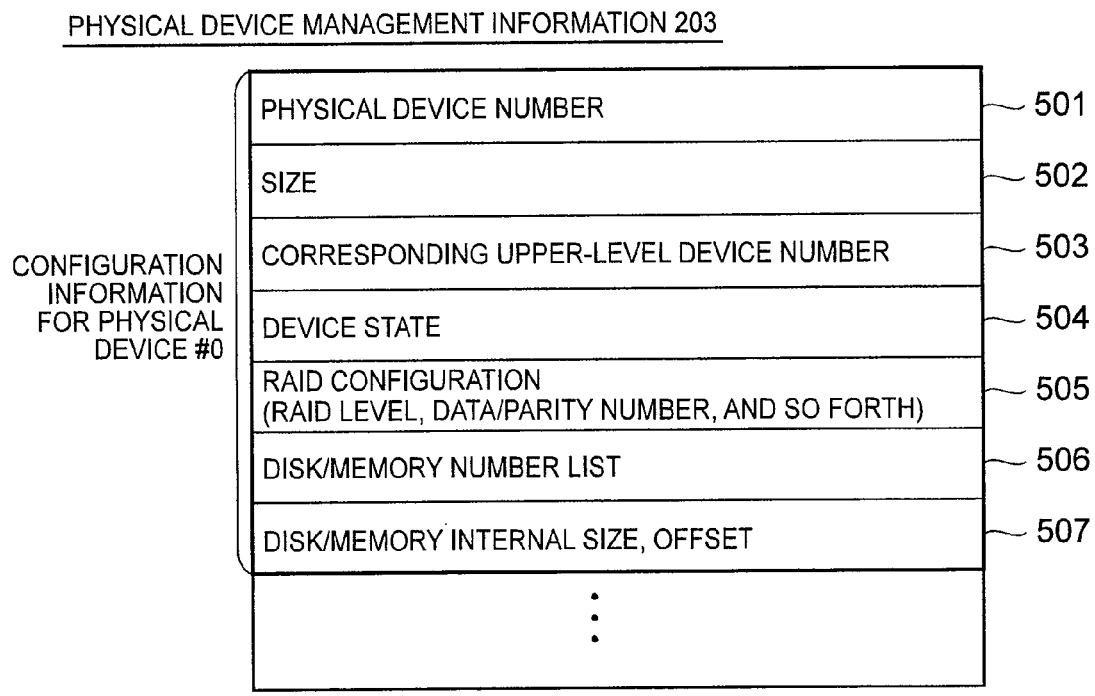
FIG. 5 shows an example of physical device management information.

Thirdly, the physical device management information 203 will be described. The physical device management information 203 is used in the management of physical devices which are constituted by one or more disk devices 137 in the storage system 130 or one or more areas of the permanent area of the nonvolatile memory 134. FIG. 5 is an example of the physical device management information 203. The respective storage systems 130 hold information sets from the physical device number 501 to the disk/memory internal size and an offset 507 for each physical device that is present in its own device.

The physical device number 501 registers an identification number for identifying a physical device. Size 502 stores the capacity of the physical device specified by the physical device number 501. The logical device or pool volume number with which the physical device is associated is stored in the event that the logical device or pool volume has been defined as the corresponding higher-level device number 503. In cases where the physical device has not been assigned to a logical device or pool volume, an invalid value is set for entry 503. The device state 504 has information indicating the state of the physical device set for device state 504. The states 'attached', 'detached', 'unmounted', and 'blocked' exist. 'Attached' indicates a state where the physical device is working normally and has been assigned to a logical device or pool volume. 'Detached' indicates a state where the physical device has been defined and is working normally but has not been assigned to a logical device or pool volume. 'Unmounted' indicates a state where the physical device of the physical device number has not been defined on the disk device 137. 'Blocked' indicates a state where a fault has occurred with the physical device and same cannot be accessed. The initial value of the device state 504 is 'unmounted', which is changed to 'detached' as a result of physical device definition processing and to 'attached' in the event that the logical device is defined. RAID configuration 505 holds information relating to the RAID configuration such as the RAID level of the disk device 137 or permanent area of the nonvolatile memory 134 to which the physical device has been assigned, the numbers of data disk devices/memory areas and parity disk devices/memory areas and the size of the stripes which are the data partition units. Disk/memory number list 506 holds the respective identification numbers of the plurality of disk devices 137 or the plurality of areas of the permanent area of the nonvolatile memory 134 constituting the RAID to which the physical device has been assigned. The identification numbers of the plurality of areas of the disk device 137 and the permanent area of the nonvolatile memory 134 are unique values assigned in order to identify the disk devices 137 and the plurality of areas of the permanent area of the nonvolatile memory 134 in the storage system 130. The disk/memory internal size/offset 507 is information indicating which area in each disk device 137 or specified area of the permanent area of the nonvolatile memory 134 the physical device is assigned to. In this embodiment, for the sake of simplification, all the physical devices have the same offset and size in each disk device 137 or specified area of the permanent area of the nonvolatile memory 134 which constitute the RAID.

Figure 6:
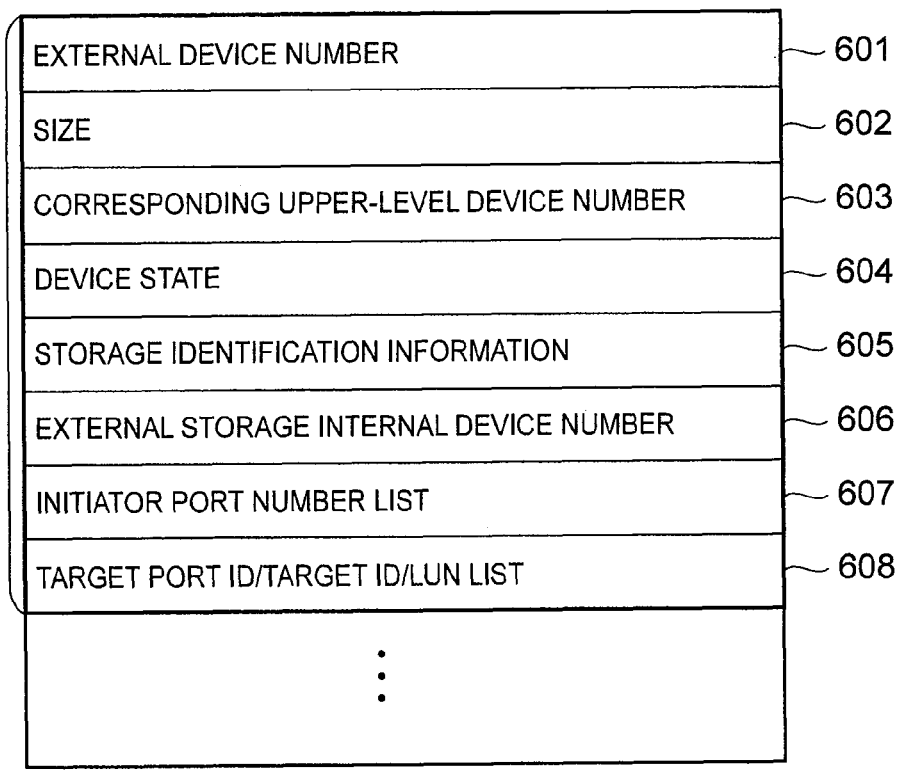
FIG. 6 shows an example of external device management information.

Fourthly, the external device management information 204 will be described. The external device management information 204 is used in order to manage logical devices of the external storage systems 150 connected to the storage system 130 as external devices. FIG. 6 is an example of the external device management information 204. The storage system 130 holds information sets from the external device number 601 to the target port ID/target ID/LUN list 608 for each external device managed by the storage system 130. The external device number 601 stores a unique value in the storage system 130 that the control processor 132 of the storage system 130 has assigned to the external device. The size 602 stores the capacity of the external device specified by the external device number 601. The corresponding higher-level device number 603 registers the number of the logical device or pool volume in the storage system 130 with which the external device is associated. As per the device state 504 of the physical device management information 203, the state of the external device is set for the device state 604. The storage system 130 is not connected to the external storage system 150 in its initial state and, therefore, the initial value of the device state 604 is 'unmounted'. The storage identification information 605 holds identification information for the external storage systems 150 constituting the external device. Identification information that may be considered includes a combination of vendor identification information for the same storage system and manufacturing serial numbers to which the respective vendors are uniquely assigned, and so forth. The external storage internal device number 606 stores the identification number assigned within the external storage system 150 to the logical device of the external storage system 150 that corresponds with the external device, that is, the logical device number. The initiator port number list 607 registers the identification number of the port 131 of the storage system 130 that permits access to the external device. In cases where the external device can be accessed from a plurality of ports 131, a plurality of port identification numbers are registered. The target port ID/target ID/LUN list 608 holds the port IDs of the ports 151 and one or a plurality of target ID/LUN to which the external device is assigned in cases where the LUN of one or more ports 151 of the external storage system 150 are defined for external device. In cases where the control processor 132 of the storage system 130 accesses an external device (in cases where the control processor transmits an I/O request to the external device from ports 131), the target ID and LUN assigned to the external device is used by the external storage system 150 to which the external device belongs as information for identifying the external device.

Fifthly, the expansion volume management information 207 will be described. In this embodiment, an expansion volume is a virtual volume to which a physical storage area is not assigned when the expansion volume is defined and which dynamically adds and assigns a storage area of the pool volume as a physical storage area that corresponds to the access part in accordance with update access by the host computer or the like. This information is used to manage the relationship between the expansion volume and the logical device and pool volume.

Figure 7:
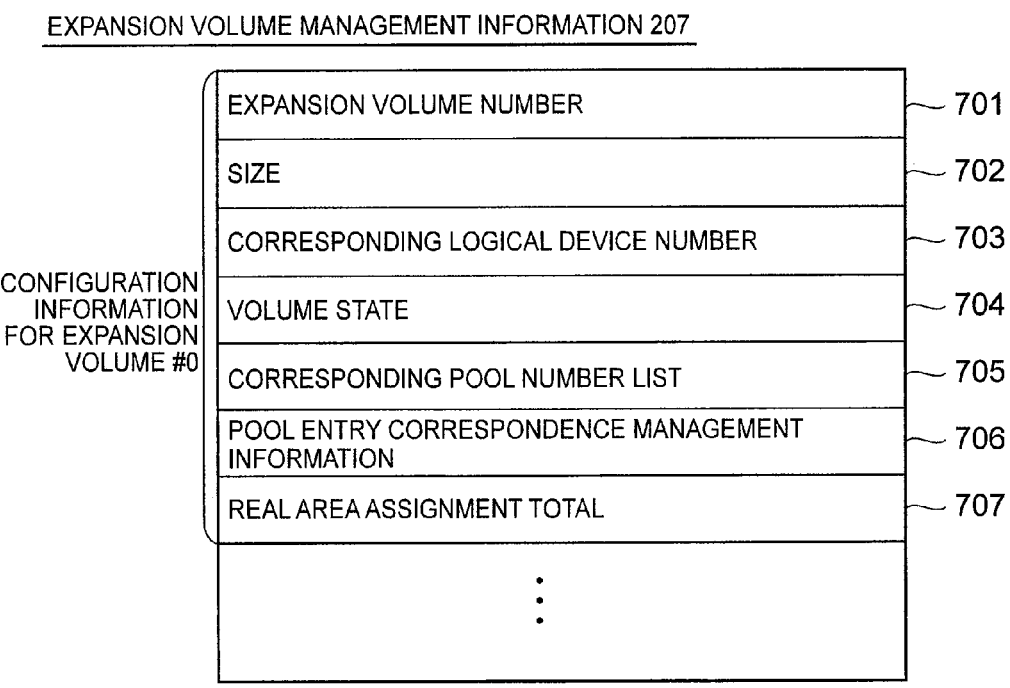
FIG. 7 shows an example of expansion volume management information.

FIG. 7 is an example of the expansion volume management information 207. The storage system 130 holds an information set from an expansion volume number 701 to a real area assignment total 707 for each of the expansion volumes. The expansion volume number 701 stores a unique value in the storage system 130 that has been assigned to the expansion volume by the control processor 132 of the storage system 130. Size 702 stores the apparent capacity from the host computer of the expansion volume specified by the expansion volume number 701. The corresponding logical device number 703 registers the number of the logical device in the storage system 130 with which the expansion volume is associated. The state of the expansion volume is set for the volume state 704 as per the same name information of the physical device management information 203. The initial value of the volume state 704 is 'unmounted' in this embodiment. The corresponding pool number list 705 holds the numbers of all the pool volumes that store the physical storage areas of the expansion volume. The pool entry correspondence management information 706 stores information indicating the correspondence between the storage space that the expansion volume provides for the host computer and physical storage area in the corresponding pool volume. In an initial state where only the expansion volume has been defined, a physical storage area has not been assigned to the volume. Hence, the whole storage area of the volume is in an unassigned state. When update access to the logical device corresponding to the expansion volume is made by the host computer or the like, the access target position in the expansion volume is calculated and a check is made of whether a pool volume storage area has been assigned to the relevant storage area entry. In cases where a physical storage area has not been assigned to the access target storage area, a suitable storage area is selected from one or more pool volumes indicated by the corresponding pool number list 705 and assigned as a physical storage area of the access target area of the expansion volume. The final real area assignment total 707 stores the total amount of physical storage area assigned to the expansion volume.

Sixthly, the pool volume management information 208 will be described. According to the present invention, the pool volume is a virtual volume that provides and manages a storage area that is assigned as the physical storage area of an expansion volume. This information is used to manage the relationship between the pool volume and the expansion volume and physical/external device.

Figure 8:
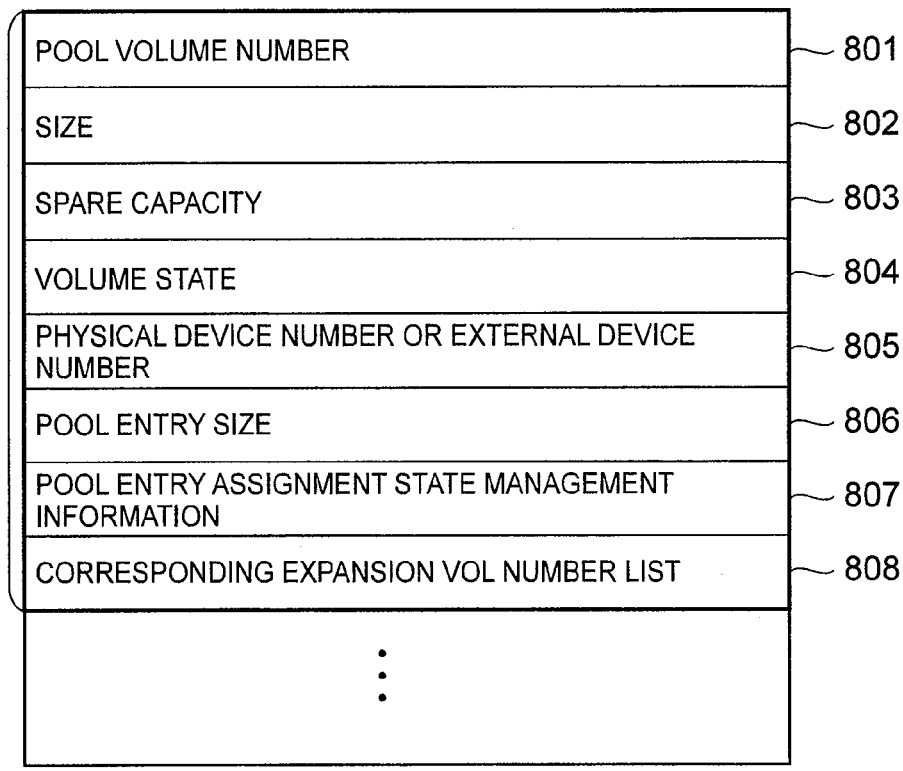
FIG. 8 shows an example of pool volume management information.

FIG. 8 shows an example of the pool volume management information 208. The storage system 130 holds an information set from a pool volume number 801 to a corresponding expansion volume number list 808 for all of the pool volumes. The pool volume number 801 stores a unique value in the storage system 130 that has been assigned to the pool volume by the control processor 132 of the storage system 130. The size 802 stores the capacity of the pool volume specified by the pool volume number 801 and spare capacity 803 stores the total of the storage area that has not been assigned to an expansion volume. The state of the pool volume is set for the volume state 804 in the same way as the same name information of the expansion volume management information 207. The physical/external device number 805 holds the number of the physical/external device to which the pool volume is assigned. The pool entry size 806 stores information that indicates the size of the unit (entry) assigned when the storage area of the pool volume is assigned as the physical storage area of the expansion volume. The storage area of the expansion storage area is partitioned into a plurality of entries in the entry size of the corresponding pool volume and the state of correspondence between the respective entries of the expansion volume and the respective entries of the pool volume is held as the pool entry assignment state management information 807. The corresponding expansion volume number list 808 holds the numbers of one or more expansion volumes to which the storage area of the pool volume has been assigned as a physical storage area.

Seventhly, the device operation information 209 will be described. In this embodiment, the I/O frequency and the locality and continuity of the data length or access range and so forth is collected from the host computer 100 for each logical device. The required amount of cache memory of the physical device or external device which corresponds with each logical device, that is, the required amount of the temporary area of the nonvolatile memory 134 is calculated on the basis of this information.

In this embodiment, the storage system 130 manages the devices/volumes by using the seven device/volume management information items above. In the initial state of the storage system 130, physical devices are already defined upon shipping from the factory for the respective disk devices 137 and the permanent area of the nonvolatile memory 134 and the logical device, external device, expansion volume, and pool volume are each undefined. In addition, the user or storage administrator defines the logical devices of the external storage system 150, which are connected to the same storage system 130 when the storage system 130 is introduced, as external devices, defines logical devices and pool volumes in the physical devices and external devices and, in the case of pool volumes, further defines expansion volumes and logical devices and defines LUNs for the respective ports 131 for the logical devices.

In addition, the storage system 130 saves the nonvolatile memory management information 206 and cache management information 205 to the control memory 135 in order to manage the nonvolatile memory 134 and the temporary area assigned to the nonvolatile memory 134. The management information for the nonvolatile memory 134 saves the assignment status of the respective areas of the memory space provided by the built-in nonvolatile memory 134, that is, information indicating which of the temporary area or permanent area has been assigned or not assigned. The cache management information 205 is constituted by area management information for the temporary area of the nonvolatile memory 134 and hit or miss judgment information that indicates which of the data in the address space of the physical device or external device are stored in which temporary areas. As a method of managing temporary areas, for example, a method that involves partitioning the temporary area into small areas (segments) of a prescribed size, holding information on the correspondence between the address spaces of the physical device or external device and each segment, and information indicating whether the information held by each segment is not written by the device (dirty) or written (clean) may be considered.

Thereafter, returning once again to FIG. 2, programs that are stored in the memory 133, 153, and 112 of storage system 130, external storage systems 150 and management server 110 respectively will be described. In addition to storing a copy of the control information, each memory stores a program that is operated by the control processors 132 and 152 and the CPU 111 in the respective parts.

In this embodiment, processing to assign a temporary area of the nonvolatile memory 134 of the storage system 130, processing to assign a physical device which is associated with this processing, and processing to define a device will be described. In addition, according to the second embodiment (described subsequently), processing to change the assignment of the temporary area and device migration processing which is associated with this processing will be described. This processing is executed in response to a request from the user or from an application as a result of co-operation between the management server 110, storage system 130, and external storage systems 150.

First, in correspondence with the temporary area assignment processing of the nonvolatile memory 134, the temporary area definition instruction processing 243 by the management server 110 is stored to the memory 112, and the temporary area assignment processing 224 and physical device definition processing 226 by the storage system 130 are stored to the memory 133.

Figure 9:
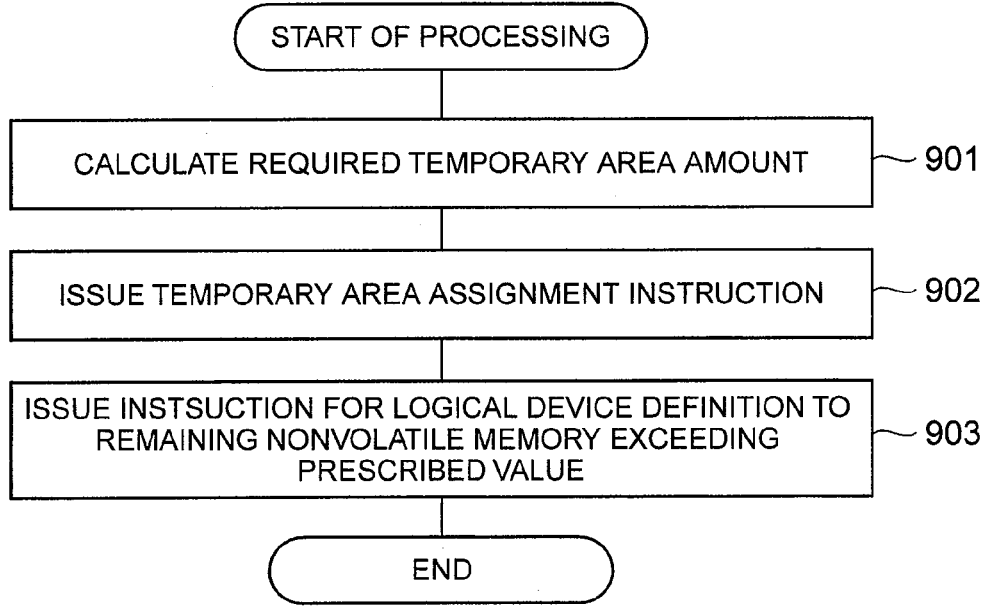
FIG. 9 shows an example of the process flow of temporary area definition instruction processing 243 which is executed by a management server 110 according to a first embodiment.

FIG. 9 shows an example of the process flow of temporary area definition instruction processing 243 which is executed by management server 110. The management server 110 calculates the capacity of a temporary area that must be assigned to the nonvolatile memory 134 of the storage system 130 on the basis of the information in the copy 231 of the device management information (step 901). More specifically, the management server 110 calculates the capacity of the physical/external device from the physical device management information 203 and external device management information 204, obtains the access attributes (frequency and locality, and so forth) of the physical/external devices that correspond with the respective logical devices from the device management information 209, and calculates the required amount of temporary area on the basis of the access attributes. For example, a method that involves estimating the cache hit improvement rate with respect to the temporary area assignment capacity from the access frequency and locality and exercising control so that the performance expected of the respective logical devices is achieved may be considered. A variety of algorithms exist for the calculation of the capacity of the temporary area. If the temporary area required amount is calculated on the basis of a specified algorithm, an instruction to assign a temporary area to the nonvolatile memory 134 is issued to the storage system 130 (step 902). Once the assignment of a temporary area is complete, the amount and proportion of the area of the nonvolatile memory 134 that has not been assigned as the temporary area or permanent area (called an 'unassigned area' hereinbelow) is then calculated and, in cases where the amount and proportion exceed a prescribed level, an instruction is issued to the storage system 130 to define the physical device by defining the excessive nonvolatile memory 134 as the permanent area (step 903). As a result, the excessive nonvolatile memory 134 is included as a spare device that is managed by the storage system 130 as a physical device.

Figure 10:
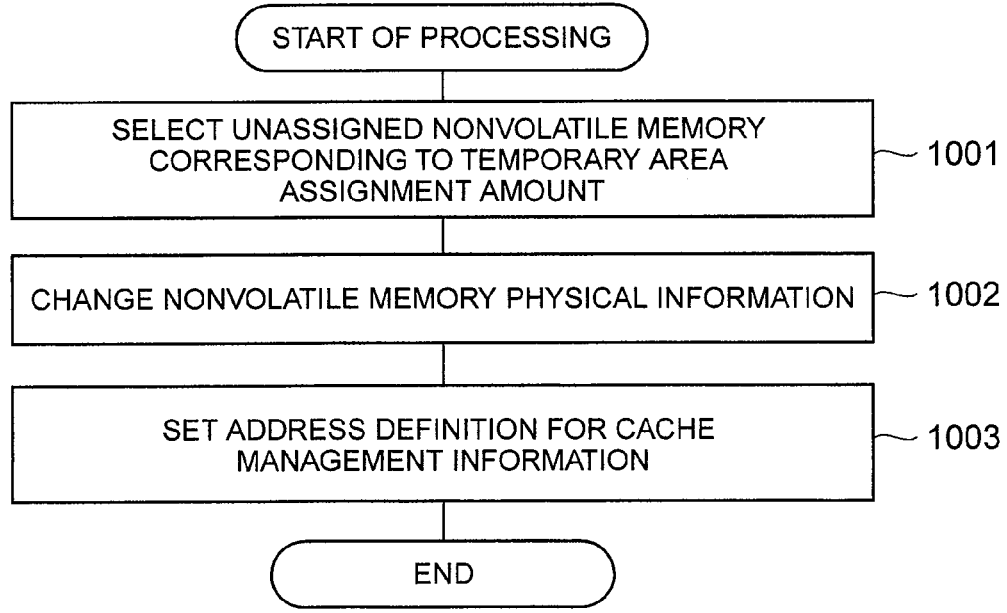
FIG. 10 shows an example of the process flow of temporary area definition processing 224 that is executed by a storage system 130 according to the first embodiment.

FIG. 10 shows an example of the process flow of temporary area assignment processing 224 that is executed by the storage system 130. The control processor 132 of the storage system 130 which receives the temporary area assignment instruction from the management server 110 selects the unassigned area of the nonvolatile memory 134 corresponding with the instructed capacity on the basis of the nonvolatile memory management information 206 and changes the unassigned area to the temporary area (steps 1001, 1002). In addition, the newly assigned temporary area is registered in the cache management information 205 so as to be managed partitioned into segments (step 1003). Here, the control processor 132 performs registration with respect to the control memory 135. The control processor 132 also performs registration with respect to the memory 133 in cases where the memory 133 also has cache management information 205.

Figure 11:
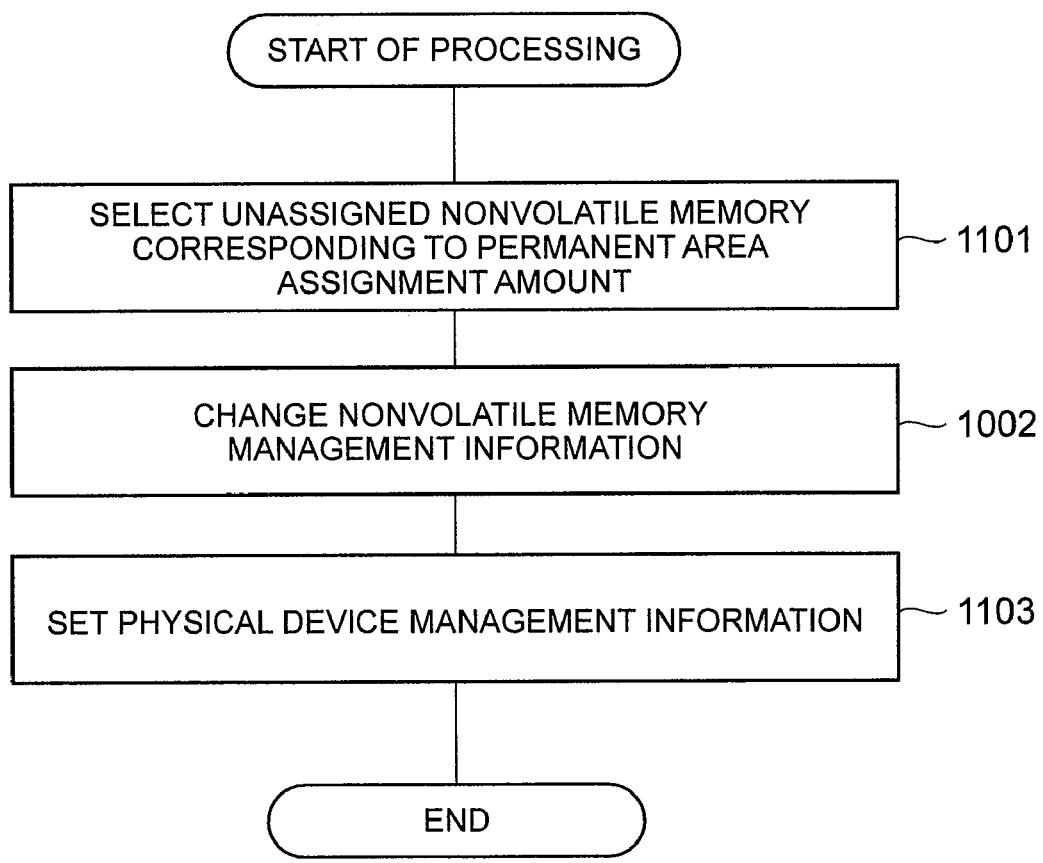
FIG. 11 shows an example of the process flow of physical device definition processing 226 which is executed by the storage system 130 according to the first embodiment.

FIG. 11 shows an example of the process flow of physical device definition processing 226 which is executed by the storage system 130. The control processor 132 of the storage system 130 that receives the physical device definition instruction with respect to an unassigned area of the nonvolatile memory 134 from the management server 110 selects an unassigned area of the nonvolatile memory 134 of a capacity that corresponds to the instruction on the basis of the nonvolatile memory management information 206 and changes the unassigned area to a permanent area (steps 1101, 1102). In addition, the control processor 132 sets the physical device management information 203 so that a physical device is defined for the newly assigned permanent area. More specifically, the control processor 132 registers the size of the permanent area defining the physical device, the identification number of the permanent area, and the offset and size in each area for the physical device management information 203 that corresponds with the specified physical device.

As described hereinabove, the temporary area of the nonvolatile memory 130 is defined as a result of the co-operation between the management server 110 and storage system 130. The logical device definition processing and the I/O processing will be described next as examples of normal processing that accompanies storage operation management in such a system environment.

First, in correspondence with the logical device definition processing, the device definition instruction processing 241 by the management server 110 is stored to the memory 112 and the device definition processing 222 by the storage system 130 is stored to the memory 133.

Figure 12:
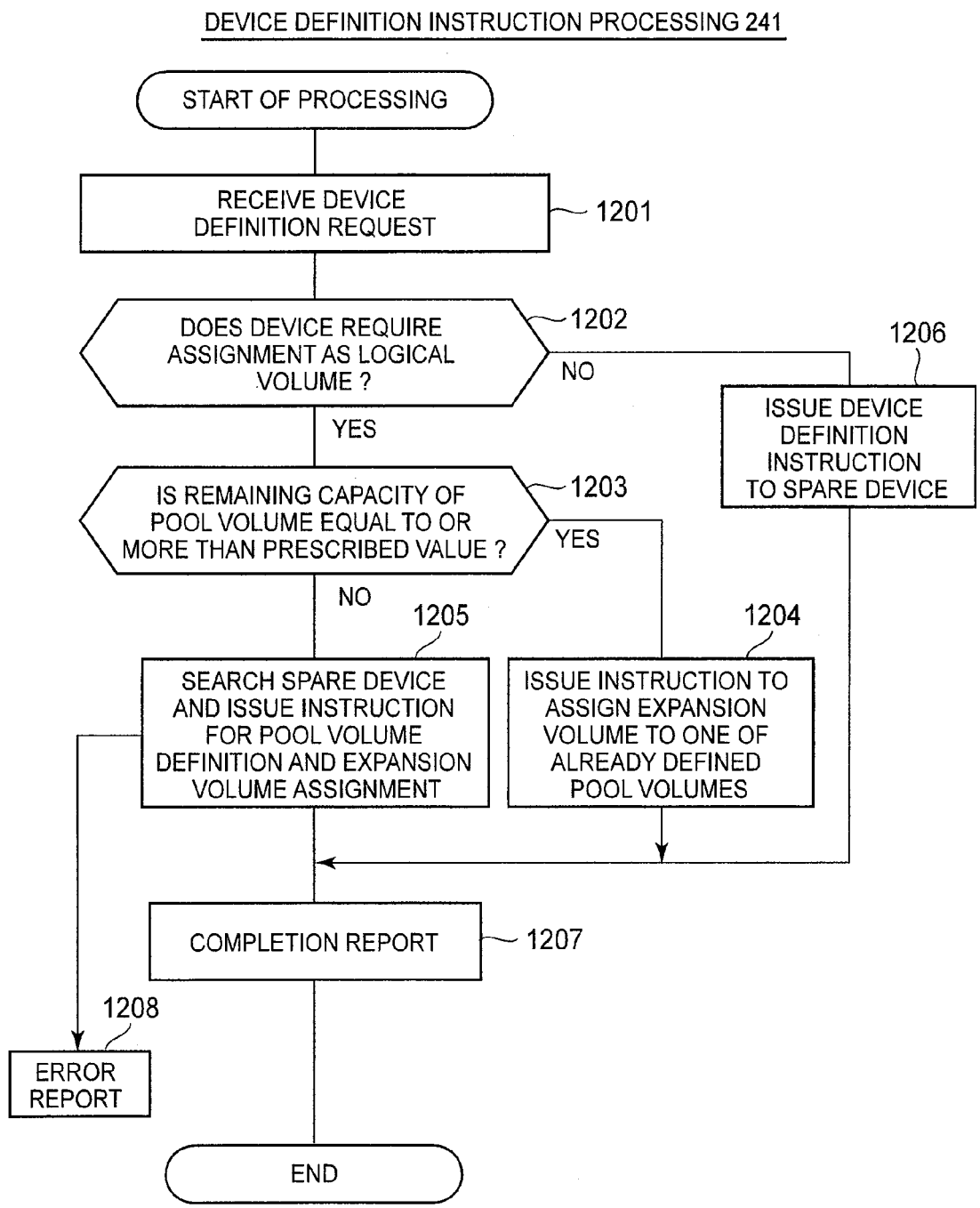
FIG. 12 shows an example of the process flow of device definition instruction processing 241 that is executed by the management server 110 according to the first embodiment.

FIG. 12 shows an example of the process flow of device definition instruction processing 241 that is executed by the management server 110. The management server 110 receives a logical device definition request of the storage system 130 from the user or an application program via an IP network 175 and interface control section 116 (step 1201). Information contained in the request that may be considered includes, for example, identification information on the storage system 130, the logical device number, access source HBA specification information (WWN or the like), port specification information (port IDs of the port 131, target IDs, a list of LUN and so forth), device attribute information (normal volume/expansion volume, applications, and so forth). The management server 110 first confirms, based on this information, that the request is from a user or an application program in the host computer 100 with management access rights to the storage system 130 based on the management access rights settings set for the storage system 130 and judges the feasibility of executing this request. Thereafter, the management server 110 judges whether the logical device is to be defined as a normal volume or defined as an expansion volume from the information contained in the device definition instruction (step 1202). In cases where the logical device has been assigned as an expansion volume, the management server 110 defines the expansion volume that corresponds with one of the already defined pool volumes if the remaining capacity of all of the pool volumes corresponding with the physical/external device, that is, the total capacity of the areas that have not been assigned as the physical storage area of the expansion volume is equal to or more than a prescribed value, and instructs the storage system 130 to assign the logical device to the expansion volume (steps 1203, 1204). If the capacity is inadequate, the management server 110 checks among the physical/external devices for devices that have not been assigned to a logical device or pool volume ('spare devices' hereinbelow), defining a new pool volume and expansion volume if such a device exists and issuing an instruction to the storage system 130 to assign the logical device (step 1205). If no spare device exists, the management server 110 reports an error with the logical device definition processing to the source of the request (step 1208). However, in cases where the logical device is not to be defined as an expansion volume but, rather, to be defined as a normal volume in the judgment of step 1202, a spare physical/external device is sought and the assignment target device is determined and an instruction for the assignment of the logical device to the assignment target device is issued to the storage system 130 (step 1206). After issuing the instruction to the storage system 130, the management server 110 sends a completion report to the source of the request (step 1207).

Figure 13:
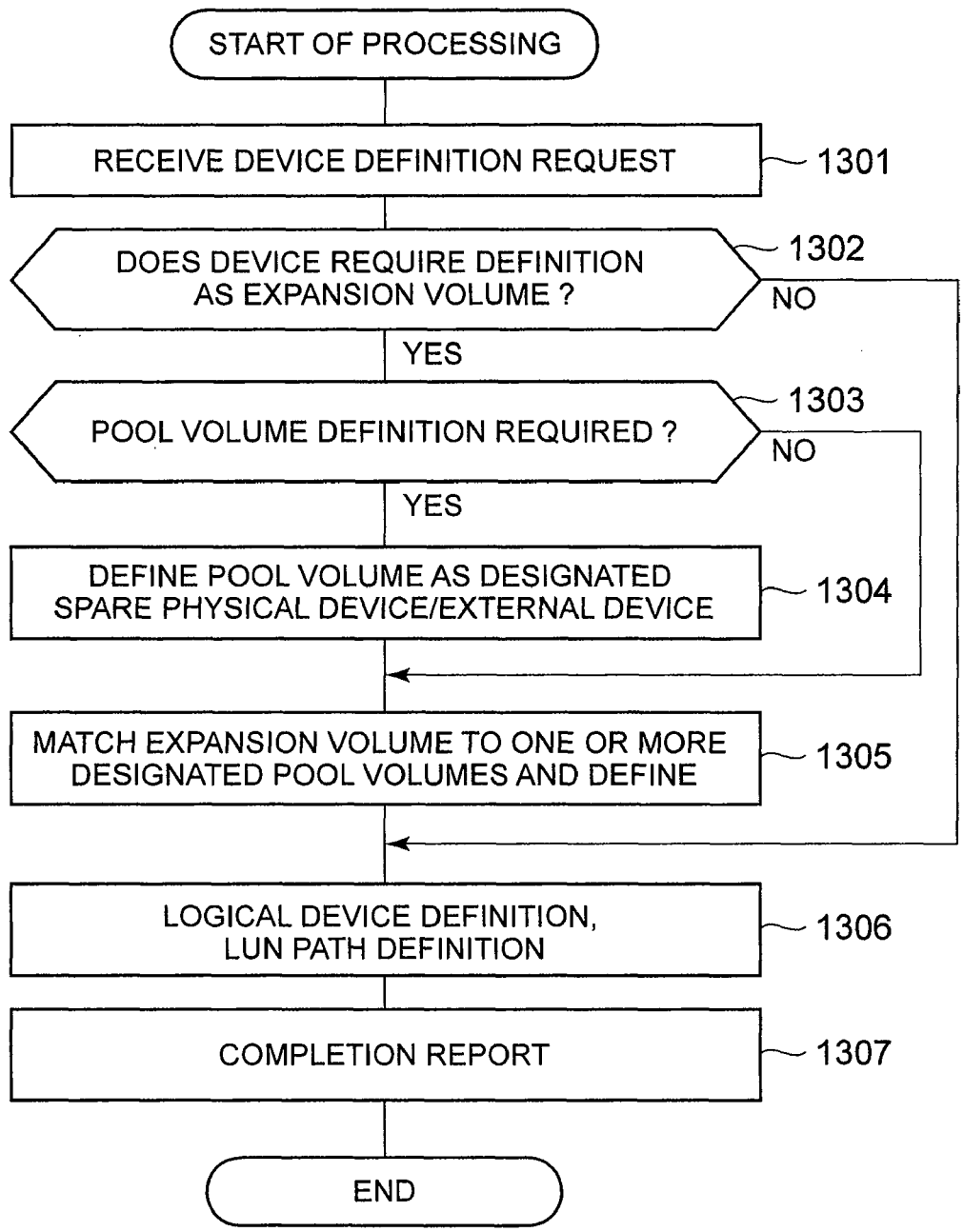
FIG. 13 shows an example of the process flow of device definition processing 222 which is executed by the storage system 130 according to the first embodiment.

FIG. 13 shows an example of the process flow of device definition processing 222 which is executed by the storage system 130. First, the storage system 130 receives a logical device definition request from the management server 110 (step 1301). Thereupon, the management server 110 transmits a logical device definition to the storage system 130 via the IP network 175 and management terminal 140. The control processor 132 stores the request in the control memory 135. In addition to the information that the management server 110 receives in the device definition instruction processing 241, the information contained in the request may include, in the case of a normal volume, the logical device assignment target physical device or external device number or the like. However, in the case of an expansion volume, the information contained in the request may include the newly assigned expansion volume number and the expansion volume assignment target pool volume number or the newly assigned expansion volume number/pool volume number and the pool volume assignment target physical device or external device number. In cases where the logical device is an expansion volume, the control processor 132 defines a pool volume for the designated physical device or external device if necessary (steps 1302, 1303, 1304), and defines an expansion volume for the pool volume (step 1305). Here, as a pool volume definition, more specifically, the control processor 132 sets, for the information entry corresponding with the designated pool volume number, the physical device number or the external device number of the assignment target as the physical device number or external device number 805, sets size 802 by referencing the management information for this device, and initializes the spare capacity 803 at the value of size 802, the volume state 804 as 'detached', and the correspondence expansion volume number list 808 as an invalid value. In addition, the control processor 132 may also use a fixed value in the storage system 130 for the pool entry size 806 or may set information indicating this size for the logical device assignment instruction from the user. The control processor 132 also initializes the pool entry assignment state management information 807 so that all the entries are unassigned to the expansion volume. In addition, for the expansion volume definition and specifically for the information entries of the pool volume management information 208 for pool volumes that corresponds with the information entries of the expansion volume management information 207 corresponding with the designated expansion volume number, the expansion volume number is registered in the correspondence expansion volume number list 808 and 'attached' is registered as the volume state 804. In addition, the control processor 132 sets the size of the logical device corresponding with the expansion volume as size 702, sets the corresponding logical device number 703 to an invalid value, sets the volume state 704 as 'detached', sets the stop flag to 'On', sets the final activation/stop time 706 as the current time, sets the corresponding pool number list 707 to the pool volume number, and sets the real area assignment total at 0. The pool entry correspondence management information 708 is initialized such that all the entries are in an unassigned state. Thereafter, the control processor 132 performs a LUN path definition for the designated port 131 after defining the logical device for the expansion volume and reports the completion of processing to the management server 110 (steps 1306, 1307). Here, for the logical device definition and, more specifically, for the corresponding logical device management information 201 and expansion volume management information 207, the control processor 132 sets the corresponding logical device number 703 to the logical device number and the volume state 704 to 'attached'. In addition, the size 302 and type 304 are set to the assignment instruction content, the corresponding lower-level device number 303 is set to the expansion volume number, the device state is set to 'detached', the entries 306 to 309 are to the invalid values, and the data migration in progress flag 310 is set to 'Off'. In addition, for the LUN path definition and, more specifically, for the corresponding logical device management information 201 and LU path management information 202, the control processor 132 sets the port information and sets the entries 306 and 307 and entries 402 and 404 as the information on the connected host computer 100 designated by the assignment instruction. In addition, the corresponding logical device number 403 is set to the logical device number. However, in cases where the logical device is a normal volume, the logical device is defined with respect to the designated spare physical device or external device and LUN path definition is performed, whereupon the completion of processing is reported (steps 1302, 1306, and 1307). Here, for the logical device definition, in specific terms, required information is set for the corresponding logical device management information 201, physical device management information 202, or external device management information 203.

Thereafter, I/O processing 221 involves storage to memory 133 by the storage system 130 in correspondence with the I/O processing with respect to the logical device by the host computer.

Figure 19:
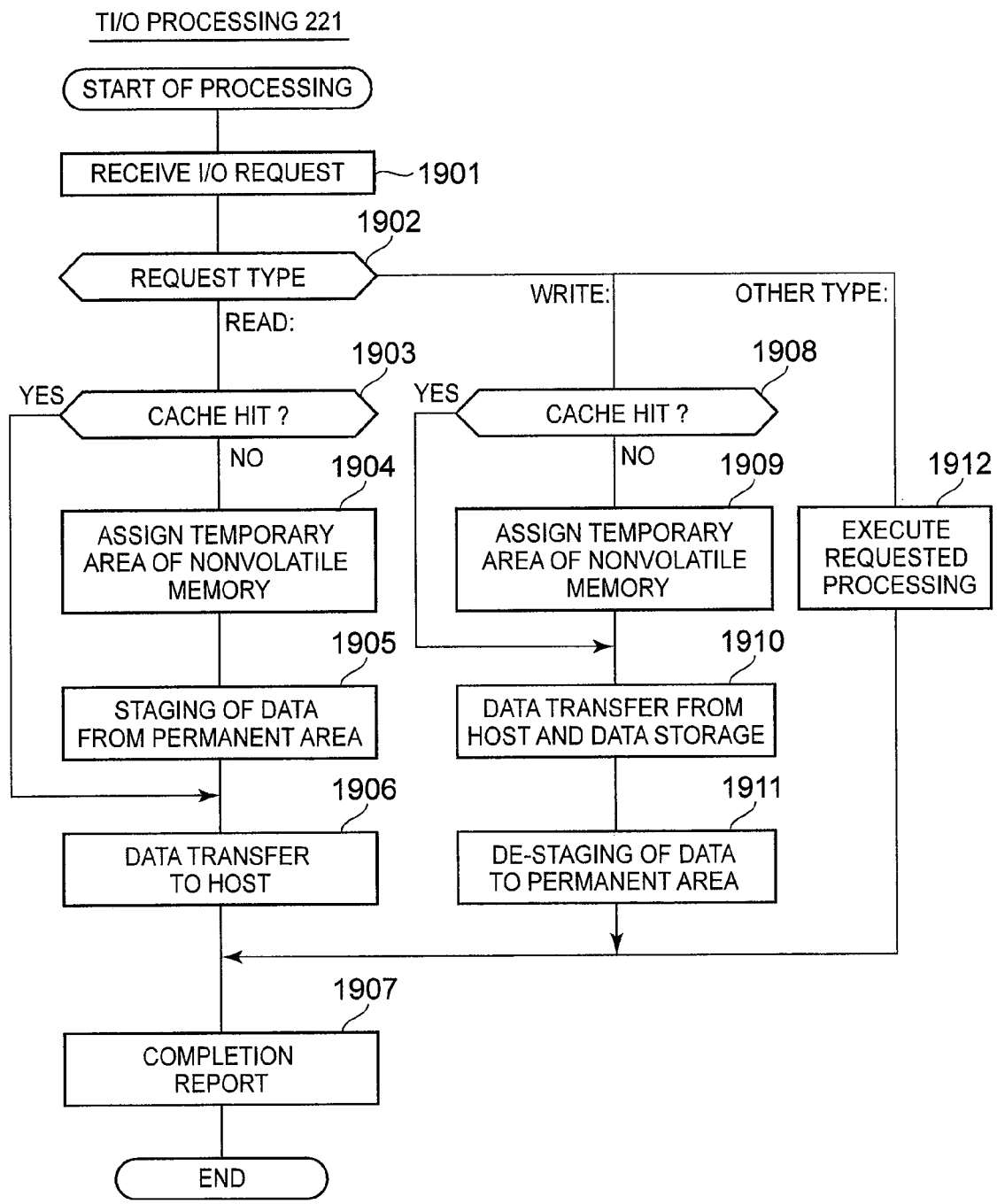
FIG. 19 shows an example of the process flow of I/O processing 221 which is executed by the storage system 130 according to the first and second embodiments.

FIG. 19 shows an example of the process flow of I/O processing 221 which is executed by the storage system 130. The storage system 130 receives an I/O request from the host computer 100 (step 1901). The control processor 132 discards the processing depending on the type of I/O request (step 1902).

In cases where the control processor 132 judges in step 1902 that the request is a read request, the control processor 132 judges, based on the cache management information 205, whether there is a cache hit or cache miss for the read target data (step 1903). In the case of a cache miss, the cache management information 205 is manipulated and a spare segment from the temporary area of the nonvolatile memory is assigned (step 1904), whereupon data staged from the disk 137 or external storage system 150 which is a physical device are stored in the nonvolatile memory 134 (step 1905) before data are transferred to the host computer (step 1906). In the case of a cache hit, the control processor 132 reads data from the nonvolatile memory 134.

Furthermore, in step 1902, the control processor 132 discriminates the fact that the I/O request is a write request and discriminates whether there is a cache miss (step 1908). In cases where there is a cache miss, the control processor 132 assigns a spare segment (step 1909). Here, a cache miss refers to a state where a segment has not been assigned to the nonvolatile memory 134 for a certain data area of the logical device. Thereafter, after storing write data from the host computer in the segment (step 1910), the control processor 132 de-stages the data to the permanent area of the physical device or external device or the like (step 1911). However, in cases where a cache hit is discriminated in step 1908, because a temporary area assigned to the write target data exists in the nonvolatile memory 134, data are stored at the relevant address in that temporary area.

However, in cases where the control processor 132 discriminates that the I/O request is neither a write request nor a read request in step 1902 (a sensing command or the like, for example), the control processor 132 executes the requested processing (step 1912).

Finally, the control processor 132, which has executed the processing, reports the completion of processing to the host computer 100 and ends the processing (step 1907).

This embodiment affords the following effects by virtue of the above configuration. This embodiment is capable of determining the capacity of the temporary area in accordance with the configuration of a virtual storage system and the capacity and access characteristics of the virtualized device, and is able to utilize a nonvolatile memory as a temporary area or permanent area.

Second Embodiment

In the first embodiment, a method that involved calculating the required capacity of the temporary area from the capacities and access characteristics of a physical device and external device which are managed by the storage system 130 and assigning the required temporary area was described. In the second embodiment, a method that involves sensing an increase or reduction in external storage systems as well as changes to the access characteristics with respect to the respective devices thereof and then reviewing the temporary area assignment amount will be described.

The second embodiment will be described using FIGS. 1 to 8 and FIGS. 14 and 18. The first and second embodiments have many points in common and, therefore, only the differences between the two embodiments will be mentioned.

The software configuration of the second embodiment is shown in FIG. 2 as per the first embodiment. In the second embodiment, in correspondence with the assignment change processing for the temporary area of the nonvolatile memory 134, the temporary area change instruction processing 244 by the management server 110 is first stored to memory 112 and the temporary area assignment cancellation processing 225, device migration processing 223, and physical device definition cancellation processing 227 by the storage system 130 are each stored to memory 133.

Figure 14:
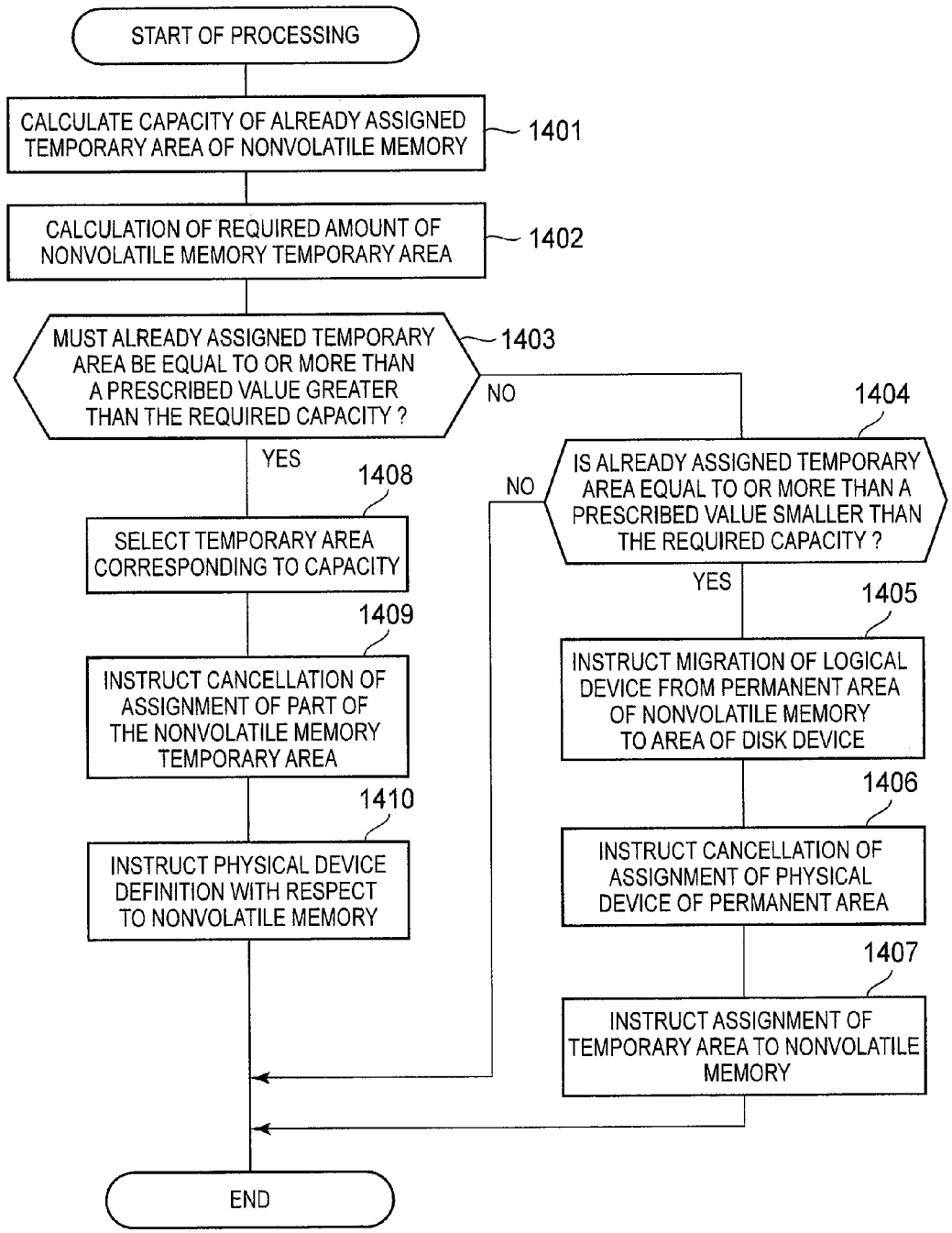
FIG. 14 shows an example of the process flow of temporary area change instruction processing 244 which is executed by the management server 110 according to a second embodiment.

FIG. 14 shows an example of the process flow of the temporary area change instruction processing 244 that is executed by the management server 110. The CPU 111 of the management server 110 calculates the capacity of the temporary area that is already assigned to the nonvolatile memory 134 at a certain point in time on the basis of the cache management information 205 and nonvolatile memory management information 206 (step 1401). In addition, using a method like that of step 1001 of the temporary area definition instruction processing 224, the required temporary area assignment amount at that point in time is calculated (step 1402). In cases where these values are compared and the difference between the two values exceeds a prescribed value, the CPU 111 controls the temporary area assignment amount. In cases where the capacity of the already assigned temporary area of the nonvolatile memory 134 is equal to or more than a prescribed value for the required amount (step 1403), the temporary area corresponding to the excess capacity is selected as a cancellation candidate (step 1408). As a method of selecting the temporary area, a temporary area including a large number of unused segments may be selected or a temporary area with a few segments storing dirty data may be selected. The CPU 111 adds information specifying the selected area and issues an instruction to the storage system 130 to cancel the assignment of the specified temporary area (step 1409). Here, only the capacity of the temporary area whose assignment needs to be cancelled may be added without selecting the temporary area whose assignment is to be cancelled and the temporary area whose assignment is to be cancelled may be determined by the storage system 130. Once the assignment of the specified temporary area is cancelled, the CPU 111 issues an instruction to the storage system 130 to set a permanent area in an unassigned area of the nonvolatile memory 134 and to perform physical device definition (step 1410). If the capacity of the already assigned temporary area is smaller than the prescribed value for the required amount, a physical device defined for the nonvolatile memory 134 which corresponds to the excess capacity is selected and an instruction is sent to the storage system 130 to transfer the logical device corresponding with the physical device to the physical device or external device defined for disk device 137 (step 1405). Once migration is complete, the CPU 111 issues an instruction to the storage system 130 to cancel the assignment of the physical device (step 1406). Once complete, the management server 110 issues an instruction to the storage system 130 to assign the unassigned area as the temporary area (step 1407).

Figure 15:
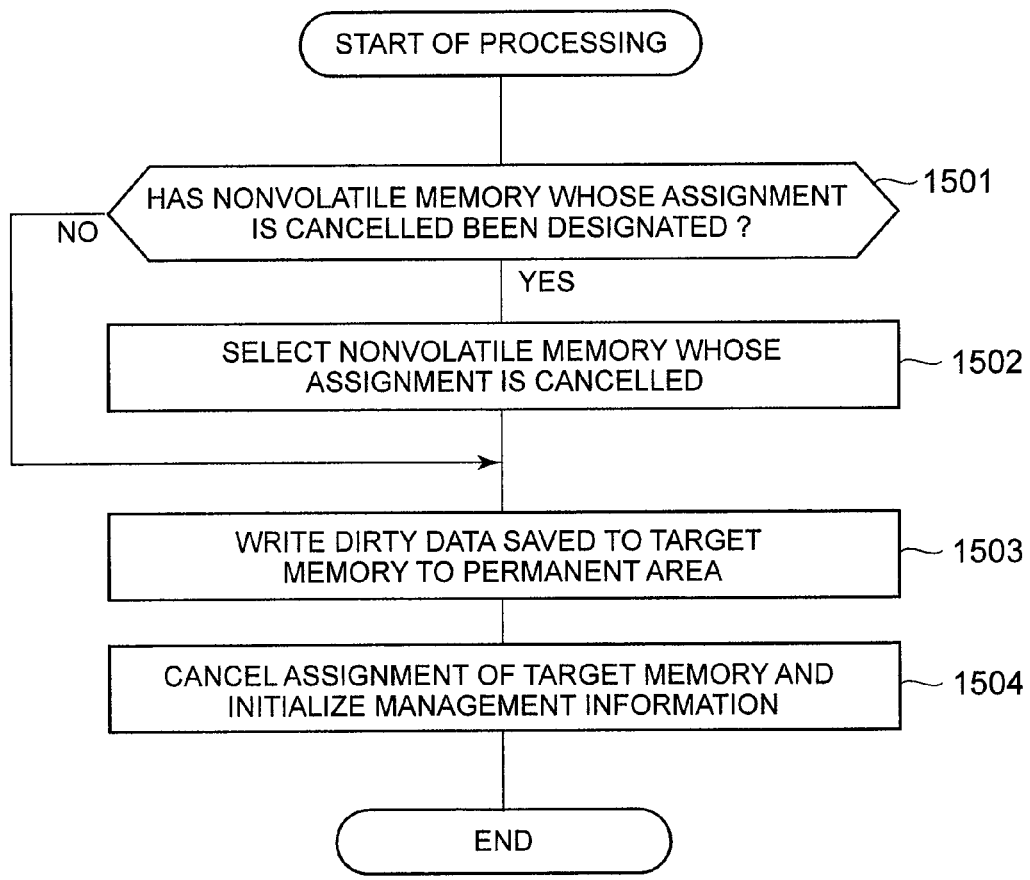
FIG. 15 shows an example of the process flow of temporary area assignment cancellation processing 225 which is executed by the storage 130 according to the second embodiment.

FIG. 15 shows an example of the process flow of temporary area assignment cancellation processing 225 which is executed by the storage 130. The storage system 130 receives a temporary area assignment cancellation instruction from the management server 110 via the management terminal 140. Thereafter, the control processor 132 selects the temporary area of the nonvolatile memory 134 constituting the assignment cancellation target if necessary (steps 1501, 1502) and, for the temporary area constituting the assignment cancellation target, confirms, based on the cache management information 205, the existence of dirty data, that is, the existence of segments storing host update data that are not written in the permanent area. If dirty data exist, the non-written data (dirty data) are de-staged to the corresponding physical device or external device (step 1503). Once the de-staging of all the dirty data of the target temporary area is complete, the corresponding entry for the nonvolatile memory management information 206 is changed to show 'unassigned area' and all the corresponding cache management information 205 is initialized (step 1504).

Figure 16:
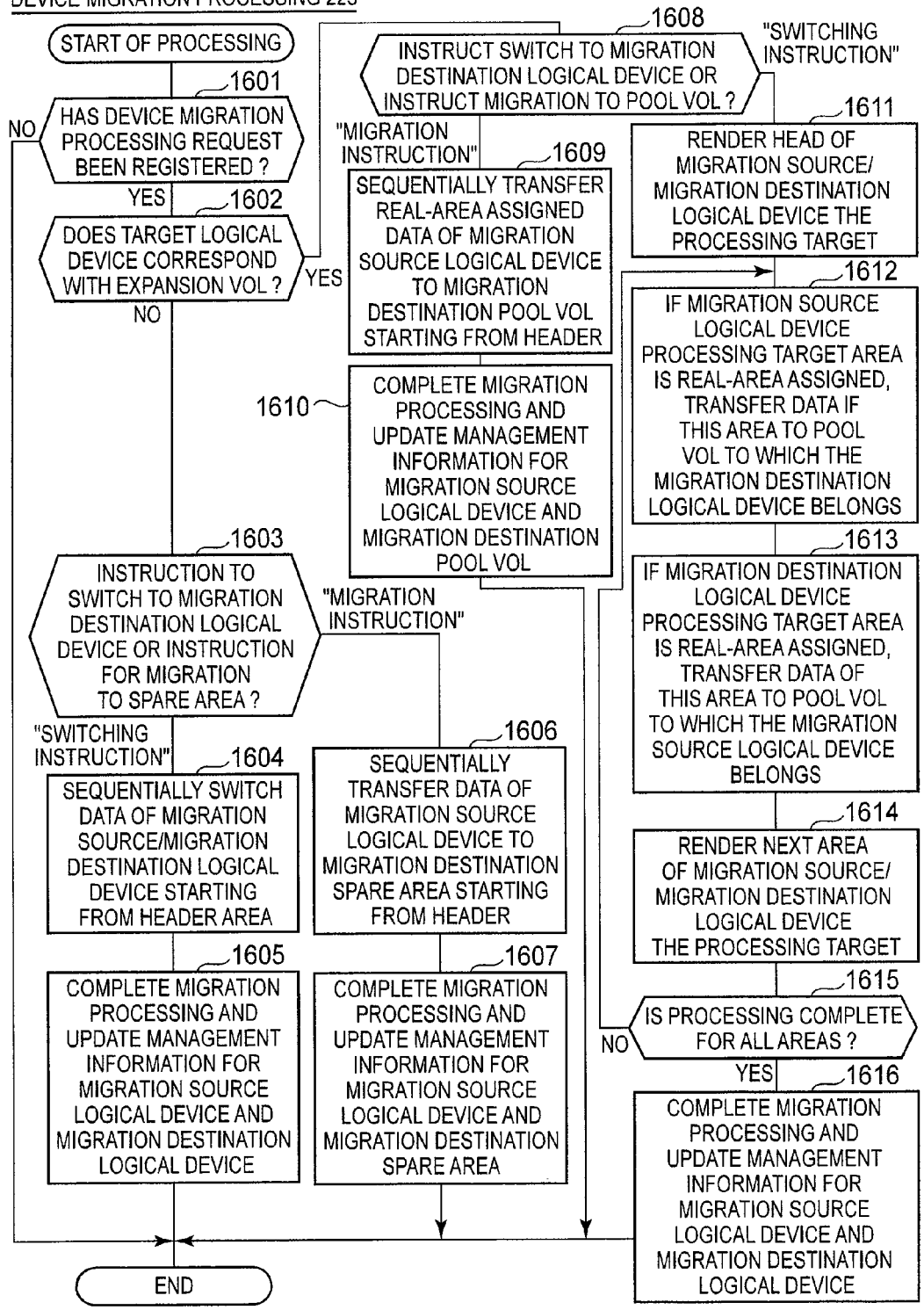
FIG. 16 shows an example of the process flow of device migration processing 223 which is executed by the storage system 130 according to the second embodiment.

FIG. 16 shows an example of the process flow of device migration processing 223 which is executed by the storage system 130 according to the second embodiment. The control processor 132 cyclically activates this processing and checks whether a device migration request has not been registered (step 1601). As mentioned earlier, the device migration request is registered when a logical device that corresponds with a physical device defined as the permanent area is transferred to the disk device 137 or external device which is another physical device in order to expand the temporary area of the nonvolatile memory 134. In addition, as will be described subsequently, the device migration request is registered when data migration between levels is required based on the data values or the like in the hierarchical storage of the permanent area of the nonvolatile memory 134, the disk device 137, and the external device which is constructed by the storage system 130. If the device migration request has not been registered, this processing is ended without being performed (step 1601). In cases where the request has been registered, the processing with respect to whether the target logical device is an expansion volume or normal volume is discarded (step 1602). In cases where the logical device is a normal device and the requested processing is transferred to a spare device, the data of the migration source logical device is sequentially transferred from the header address to a migration destination physical device or external device and, once the data migration is complete for all areas, the device management information is updated such that the migration source logical device which is mapped to the current corresponding physical device or external device will be mapped to the migration destination physical device or external device (steps 1606, 1607). Further, in cases where the requested processing is a switch to another logical device, the data of the migration source/migration destination logical device is read in sequence from the header address to another storage device such as the temporary area of the nonvolatile memory 134 and the data of the migration source logical device are switched to the migration destination logical device and the data of the migration destination logical device are switched to and written to the migration source logical device. Once the data switching is complete for all the areas of the logical device, the device management information is updated so that the relationship with the corresponding physical device or external device is switched for the migration source logical device and the migration destination logical device respectively (steps 1604, 1605).

However, in cases where the logical device is an expansion volume, when the requested processing is migration processing to another pool volume, the control processor 132 searches for an entry for which a real area has been assigned in the corresponding expansion volume in sequence starting from the logical device header entry and adds only the data of this entry to the spare entry of the migration destination pool volume. Stated in more detail, the migration destination pool volume is added to the corresponding pool volume of the expansion volume and data read from the entry of the migration source pool volume are written by assigning a spare entry of the migration destination pool volume and management information is updated so that the entry of the migration destination volume is mapped to the entry of the expansion volume. This processing is sequentially executed while using a progress pointer for the logical device management information and, once the migration processing is complete for all areas, the migration source pool volume is deleted from the corresponding pool volume of the expansion volume (the pool volume to which the logical device corresponds) (steps 1609, 1610). In addition, in cases where the requested processing is an instruction to switch to another logical device, the control processor 132 sequentially searches for an entry for which a real area (pool volume entry) has been assigned starting with the header entry of the migration source/migration destination logical device and transfers the data of the entry by newly assigning a spare entry of a partner pool volume for the target entry. In the migration processing step, when there is a large difference in the number of migration execution entries between the migration destination/migration source logical devices, there is a risk that the number of spare entries of the first pool volume will be exhausted. Hence, the progress must be controlled so that there is not a large difference in the numbers of migration execution entries between the migration destination/migration source logical devices. Once the switch processing of all areas has been completed in this manner, the device management information is updated such that the correspondence between the respective pool volumes of the migration destination/migration source logical devices is switched (steps 1611 to 1616).

Figure 17:
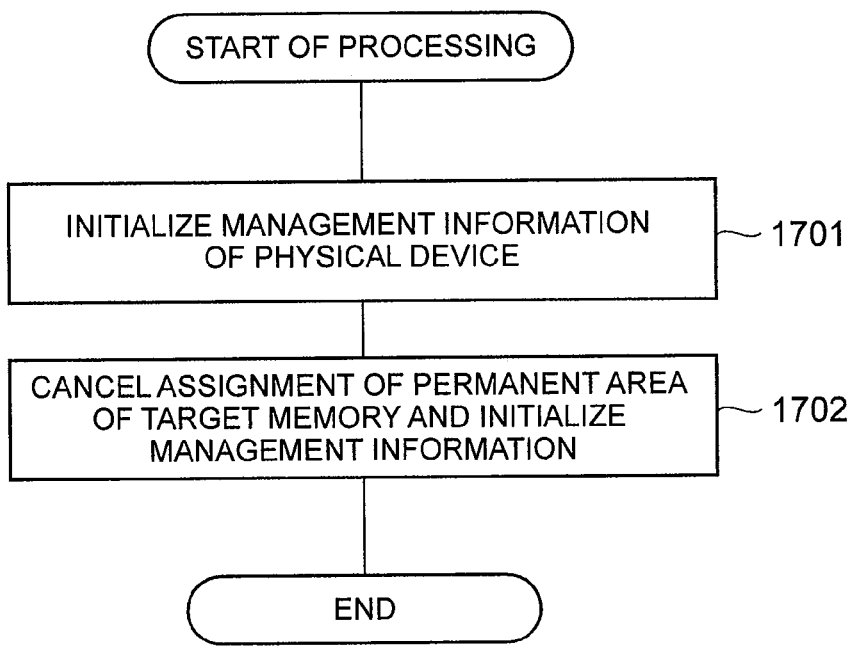
FIG. 17 shows an example of the process flow of physical device definition cancellation processing 227 which is executed by the storage system 130 according to the second embodiment.

FIG. 17 shows an example of the process flow of physical device definition cancellation processing 227 which is executed by the storage system 130. The control processor 132 initializes the physical device management information 203 corresponding with the designated physical device and cancels the correspondence between the permanent area established in the nonvolatile memory 134 and the unassigned area (step 1701). Thereafter, the nonvolatile memory management information 206 is updated so that the permanent area of the nonvolatile memory 134 is an unassigned area, whereupon the processing is ended (step 1702).

As described hereinabove, the temporary area assignment state of the nonvolatile memory 134 is changed as a result of the co-operation between the management server 110 and storage system 130. Logical device migration processing will be described next as an example of normal processing that accompanies the storage operation management in such a system environment.

In correspondence with the logical device migration processing, the device migration instruction processing 242 by the management server 110 is stored to memory 112 and the device migration processing 223 by the storage system 130 is stored to memory 133. Of these processes, the device migration instruction processing 242 that has not yet been described will be described next.

Figure 18:
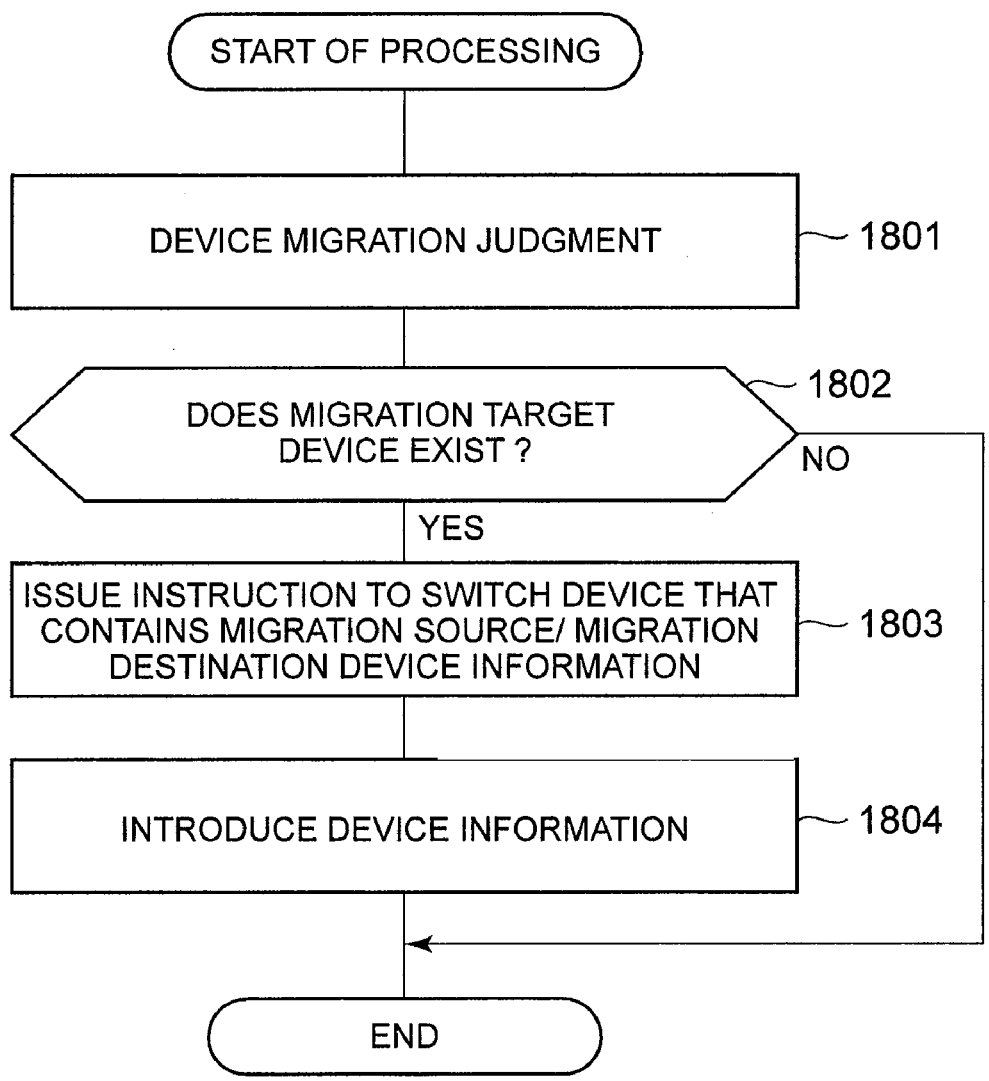
FIG. 18 shows an example of the process flow of the device migration instruction processing 242 which is executed by the management server 110 according to the second embodiment.

FIG. 18 shows an example of the process flow of the device migration instruction processing 242 which is executed by the management server 110. The management server 110 judges whether it is necessary to switch from within a logical device to another logical device that corresponds with another physical device or external device (step 1801). More specifically, as per DLCM (data life cycle management), data positioning between devices is reconsidered to establish a more preferable data positioning between the respective levels of the hierarchical storage managed by the storage system 130 on the basis of the value of the data stored in the respective logical devices and the access frequency and data protection term and so forth. In cases where, as a result of the judgment, a device for which switching is required exists (step 1802), the management server 110 issues an instruction to the storage system 130 to perform device switching in which information specifying the migration source and migration destination devices is added (step 1803), introduces the latest information on the device at the point where the switching is complete from the storage system 130 to the memory 112 and updates the copy 231 of the device management information (step 1804).

In step 1801, for example, when data positioning is performed in accordance with device unit access frequencies, the control processor 132 records the access frequency for each device unit. The CPU 111 of the management server 110 acquires information on the access frequency and issues an instruction regarding the data repositioning in accordance with an algorithm that is stored in the device migration instruction processing 242.

A case where the data repositioning is executed in file units rather than in device units will be described next. FIG. 21 shows an example of an address conversion table 2100 that the management server 110 comprises. The CPU 111 is able to create the address conversion table 210 by acquiring information from the host computer. By using the address conversion table 210, the CPU 111 is able to read and write data in file units. Furthermore, this address conversion table is created for each operating system.

FIG. 22 shows an example of the information that can be collected as a result of the CPU 101 of the host computer 100 performing execution in accordance with an instruction from the management server 110. The CPU 101 of the host computer 100 collects the file name, file generation date and time, final access date and time, file size, file address, and the LU number of the storage destination, for each file. After collecting these information items, the CPU 101 transmits same to the management server 110. The files that have not been accessed for a long time can be subjected to data repositioning in accordance with the file generation date and time and final access date and time of this information.

As a result of the configuration of the second embodiment, the assignment of the temporary area/permanent area of the nonvolatile memory can be changed dynamically in accordance with a system configuration change and access characteristic change in addition to the effects afforded by the first embodiment.

A few preferred embodiments of the present invention were described hereinabove but these embodiments are illustrations serving to explain the present invention, there being no intention to limit the scope of the present invention to these embodiments alone. The present invention can also be implemented in a variety of other forms.

For example, the present invention can also be applied to a mainframe system instead of an open system.

Moreover, the functions of the management server 110 can be combined with those of the host computer 100, for example. In this case, the management server 110 is unnecessary and both the operation and management can be implemented by the host computer. Furthermore, in cases where the management server 110 issues instructions to the storage system 130, instructions can be executed by the management server 110 in an inbound direction via a fibre channel switch rather than in an outbound direction via IP network 175.

Figure 23:
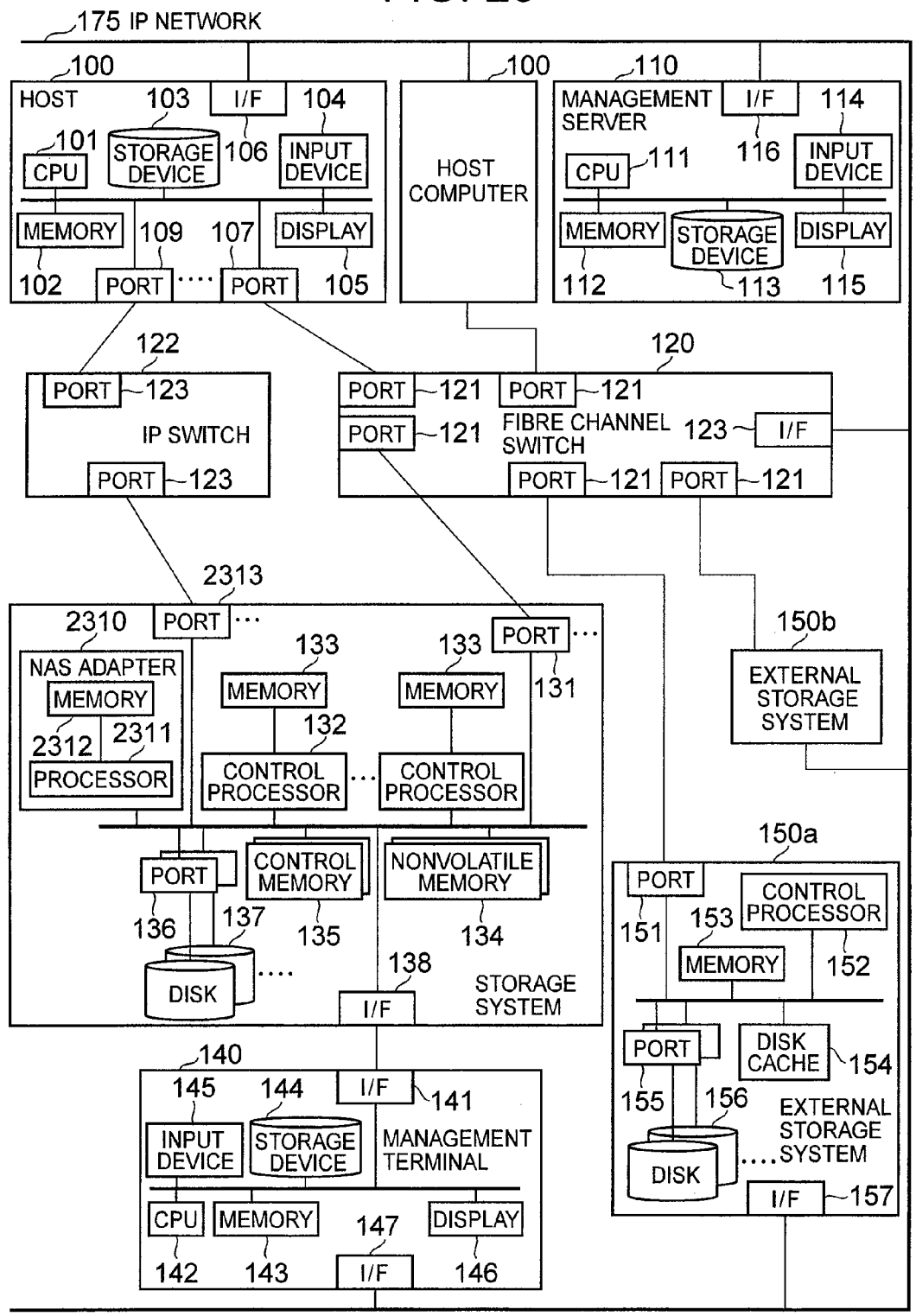
FIG. 23 shows an example of the hardware configuration of a computer system in a modified example which is common to the first and second embodiments.

For example, a NAS adapter can be built into the storage system. FIG. 23 shows an example of a storage system with a built-in NAS adapter. The difference with respect to FIG. 1 is that the NAS adapter 2312 is built into the storage system 130 and that an IP switch 122 has been added. The processor 2311 of the NAS adapter 2310 is able to convert the file access by the host computer into block access as a result of the operating system or file system that is stored in the memory 2312 and save the data in the nonvolatile memory 134, disks 137, and external storage systems 150. In cases where there is a built-in NAS adapter 2310, file collection information 2200 is collected by the processor 2311 and transmitted to the management server 110 via the management terminal 140.

What is claimed is:

1. A storage system comprising:
a storage controller providing a virtual volume;
a plurality of disk drives;
a plurality of flash memory devices, each of the plurality of flash memory devices including a memory controller and a plurality of flash memories, and being configured to be a data storage area for storing data; and
the storage controller configured to:
create a cache memory area using a first storage area of the plurality of flash memory devices in which data is temporarily stored,
create a pool area using a second storage area of the plurality of flash memory devices and a third storage area of the plurality of disk drives, the second storage area being different from the first storage area, and
allocate a storage region of the second storage area or the third storage area in the pool area to the virtual volume in response to receiving a write request to the virtual volume.

2. A storage system according to claim 1, wherein the storage controller is configured to copy data, that is temporarily stored in the first storage area, to the plurality of disk drives.

3. A storage system according to claim 1, wherein the storage controller is configured to copy data based on a frequency of a read request to the data that is stored in the plurality of the disk drives to the first storage area.

4. A storage system according to claim 1, wherein data is duplicated in the first storage area.

5. A storage system according to claim 1, wherein the storage controller is configured to create the first storage area on the basis of a first request indicating a first capacity of the first storage area, and create the pool area on the basis of a second request indicating a second capacity of the second storage area.

6. A storage system according to claim 1, wherein the storage controller is configured to transfer dirty data in the first storage area to the pool area in response to receiving a third request indicating releasing the first storage area from the cache memory area.

7. A storage system according to claim 1, wherein the second storage area is corresponded to a RAID group.

8. A storage system comprising
a storage controller providing a virtual volume;
a plurality of disk drives;
a plurality of flash memory devices, each of the plurality of flash memory devices including a memory controller and a plurality of flash memories, and being configured to be a data storage area for storing data; and the storage controller configured to:
receive a first command for setting a cache memory area using a first storage area of the plurality of flash memory devices for temporarily storing data,
receive a second command for setting a pool area using a second storage area of the plurality of flash memory devices and a third storage area of the plurality of disk drives, the second storage area being different from the first storage area, and
allocate a storage region of the second storage area or the third storage area in the pool area to the virtual volume in response to receiving a write request to the virtual volume.

9. A storage system according to claim 8, wherein the storage controller is configured to copy data, that is stored in the first storage area temporarily, to the plurality of disk drives.

10. A storage system according to claim 8, wherein data is duplicated in the first storage area.

11. A storage system according to claim 8, the first command includes a capacity information of the first storage area, and the second command includes a capacity information of the second storage area.

12. A storage system according to claim 8, wherein the storage controller is configured to transfer dirty data in the first storage area to the pool area in response to receiving a third command for releasing the first storage area from the first storage area.

13. A storage system according to claim 8, wherein the second storage area is corresponded to a RAID group.

14. A storage system according to claim 1, wherein the second storage area and the third storage area are created after creating the cache memory area.

15. A storage system according to claim 8, wherein the second storage area and the third storage area are created after creating the cache memory area.

* * * * *